US012652094B2

(12) United States Patent
Raghavan et al.

(10) Patent No.: US 12,652,094 B2
(45) Date of Patent: Jun. 9, 2026

(54) JOINT AND ITERATIVE BEAM REFINEMENT IN MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/499,146

(22) Filed: Oct. 31, 2023

(65) Prior Publication Data

US 2025/0141512 A1 May 1, 2025

(51) Int. Cl.
H04B 7/06 (2006.01)
H04L 5/00 (2006.01)

(52) U.S. Cl.
CPC ......... H04B 7/0626 (2013.01); H04B 7/0617 (2013.01); H04B 7/06958 (2023.05); H04L 5/0051 (2013.01)

(58) Field of Classification Search
CPC ............. H04B 7/0626; H04B 7/06958; H04B 7/0617; H04L 5/0051
USPC ........................................ 370/329
See application file for complete search history.

(56) References Cited

U.S. PATENT DOCUMENTS

| | | | |
|---|---|---|---|
| 2021/0099219 A1* | 4/2021 | Noh | H04B 7/088 |
| 2021/0376894 A1* | 12/2021 | Cha | H04B 7/088 |
| 2022/0231751 A1 | 7/2022 | Grant et al. | |

FOREIGN PATENT DOCUMENTS

| | | |
|---|---|---|
| WO | 2023014910 A1 | 2/2023 |
| WO | 2023080550 A1 | 5/2023 |

OTHER PUBLICATIONS

Ericsson: "Enhancements to Multibeam Operation", 3GPP TSG-RAN WG1 Meeting #98, Tdoc R1-1909225, 3rd Generation Partnership Project, Mobile Competence Centre, 650, Route Des Lucioles, F-06921 Sophia-Antipolis Cedex, France, vol. RAN WG1, No. Prague, Czech Republic, 2019026-Aug. 30, 2019, Aug. 16, 2019, 23 Pages, XP051765830, sections 2.2 and 2.3.
International Search Report and Written Opinion—PCT/US2024/044643—ISA/EPO—Mar. 17, 2025.
Partial International Search Report—PCT/US2024/044643—ISA/EPO—Dec. 18, 2024.

(Continued)

*Primary Examiner* — Faisal Choudhury
(74) *Attorney, Agent, or Firm* — Procopio, Cory, Hargreaves & Savitch LLP

(57) ABSTRACT

A method for wireless communication at a UE and related apparatus are provided. In the method, the UE receives, from a network entity, a resource configuration including a set of communication resources for one or more CSI-RSs and one or more SRSs; and communicates with the network entity on the one or more CSI-RSs and on the one or more SRSs. A set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence.

29 Claims, 12 Drawing Sheets

(56)     References Cited

OTHER PUBLICATIONS

Zte, et al., "Details of UL Beam Management", 3GPP TSG RAN
WG1 Meeting NR#3, R1-1715446, 3rd Generation Partnership
Project (3GPP), Mobile Competence Centre, 650, Route Des Lucioles,
F-06921, Sophia-Antipolis Cedex, France, vol. RAN WG1, No.
Nagoya, Japan, Sep. 18-Sep. 21, 2017, Sep. 17, 2017, XP051338914,
pp. 1-5, Section 2.2.

* cited by examiner

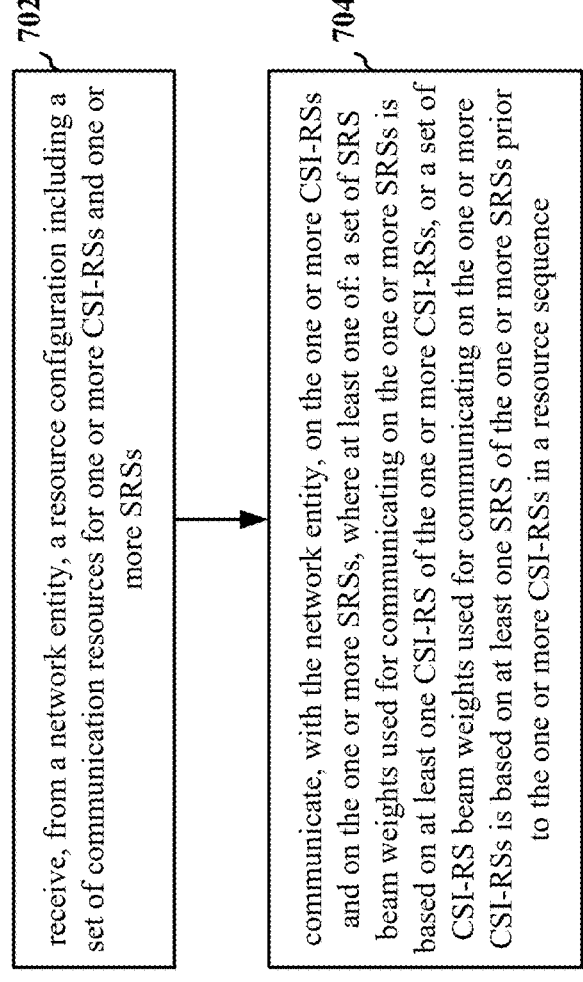

receive, from a network entity, a resource configuration including a set of communication resources for one or more CSI-RSs and one or more SRSs communicate, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence

702

704

Figure 8:
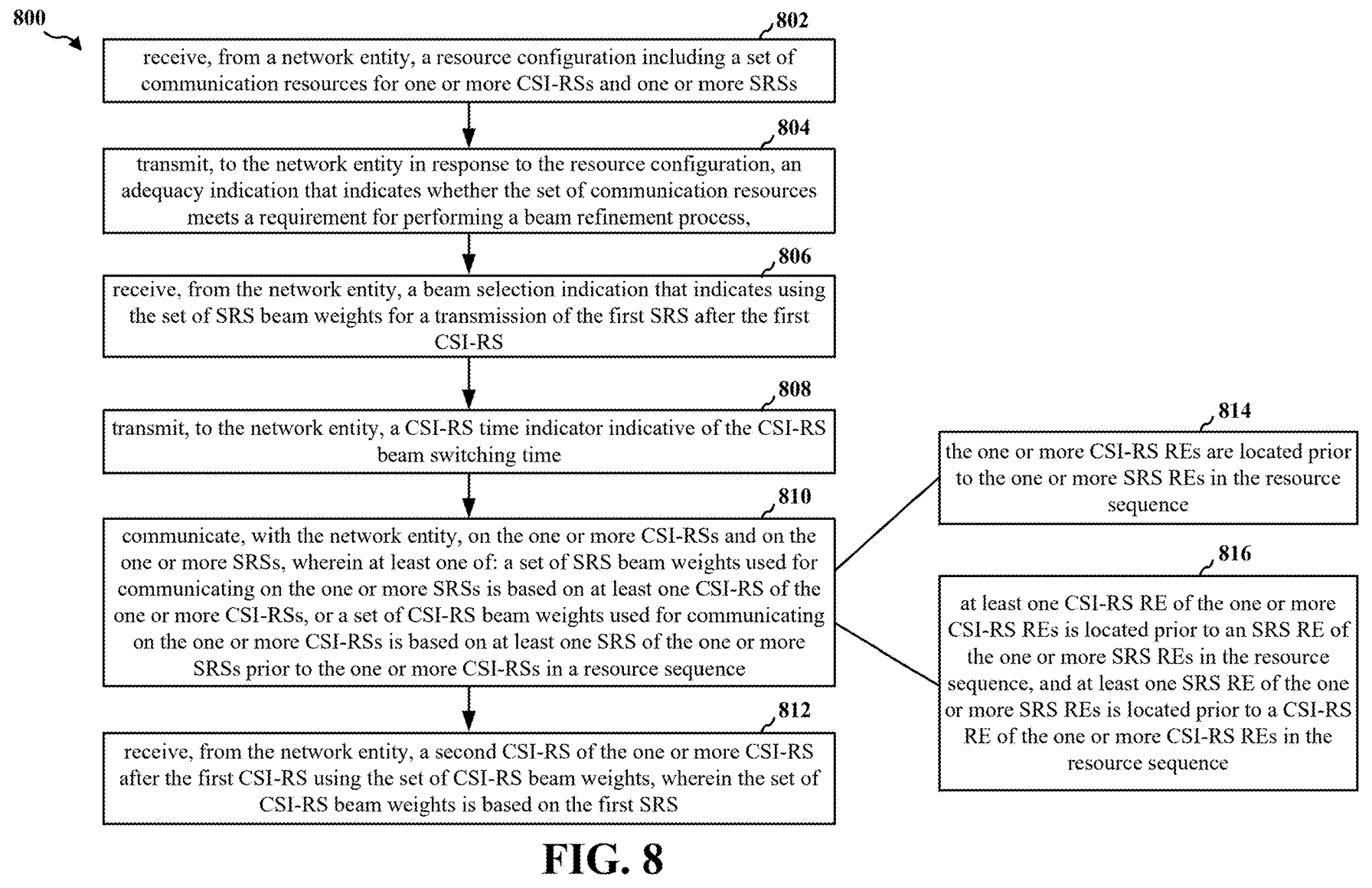

802 — receive, from a network entity, a resource configuration including a set of communication resources for one or more CSI-RSs and one or more SRSs 804 — transmit, to the network entity in response to the resource configuration, an adequacy indication that indicates whether the set of communication resources meets a requirement for performing a beam refinement process, 806 — receive, from the network entity, a beam selection indication that indicates using the set of SRS beam weights for a transmission of the first SRS after the first CSI-RS 808 — transmit, to the network entity, a CSI-RS time indicator indicative of the CSI-RS beam switching time 810 — communicate, with the network entity, on the one or more CSI-RSs and on the one or more SRSs, wherein at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence 812 — receive, from the network entity, a second CSI-RS of the one or more CSI-RS after the first CSI-RS using the set of CSI-RS beam weights, wherein the set of CSI-RS beam weights is based on the first SRS 814 — the one or more CSI-RS REs are located prior to the one or more SRS REs in the resource sequence 816 — at least one CSI-RS RE of the one or more CSI-RS REs is located prior to an SRS RE of the one or more SRS REs in the resource sequence, and at least one SRS RE of the one or more SRS REs is located prior to a CSI-RS RE of the one or more CSI-RS REs in the resource sequence

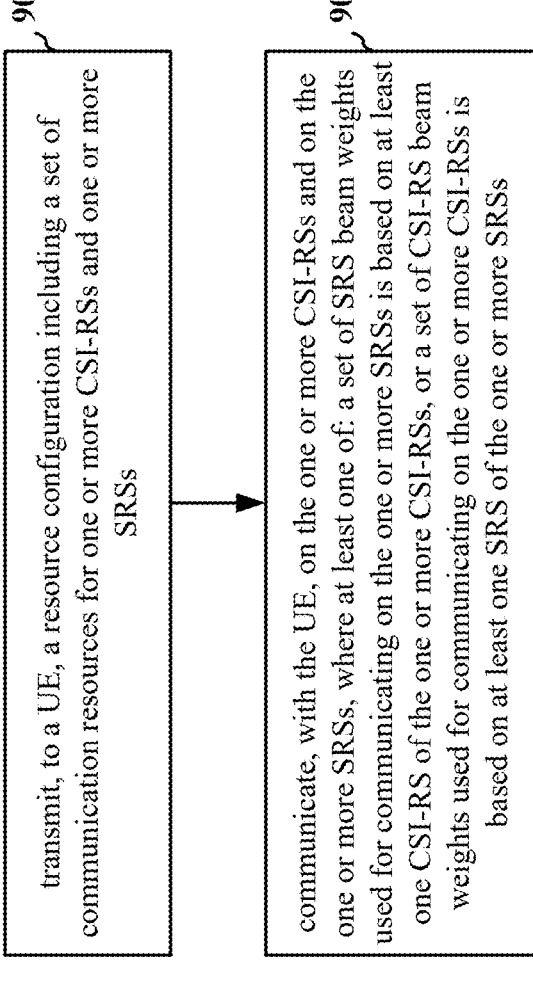

902 — transmit, to a UE, a resource configuration including a set of communication resources for one or more CSI-RSs and one or more SRSs 904 — communicate, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs

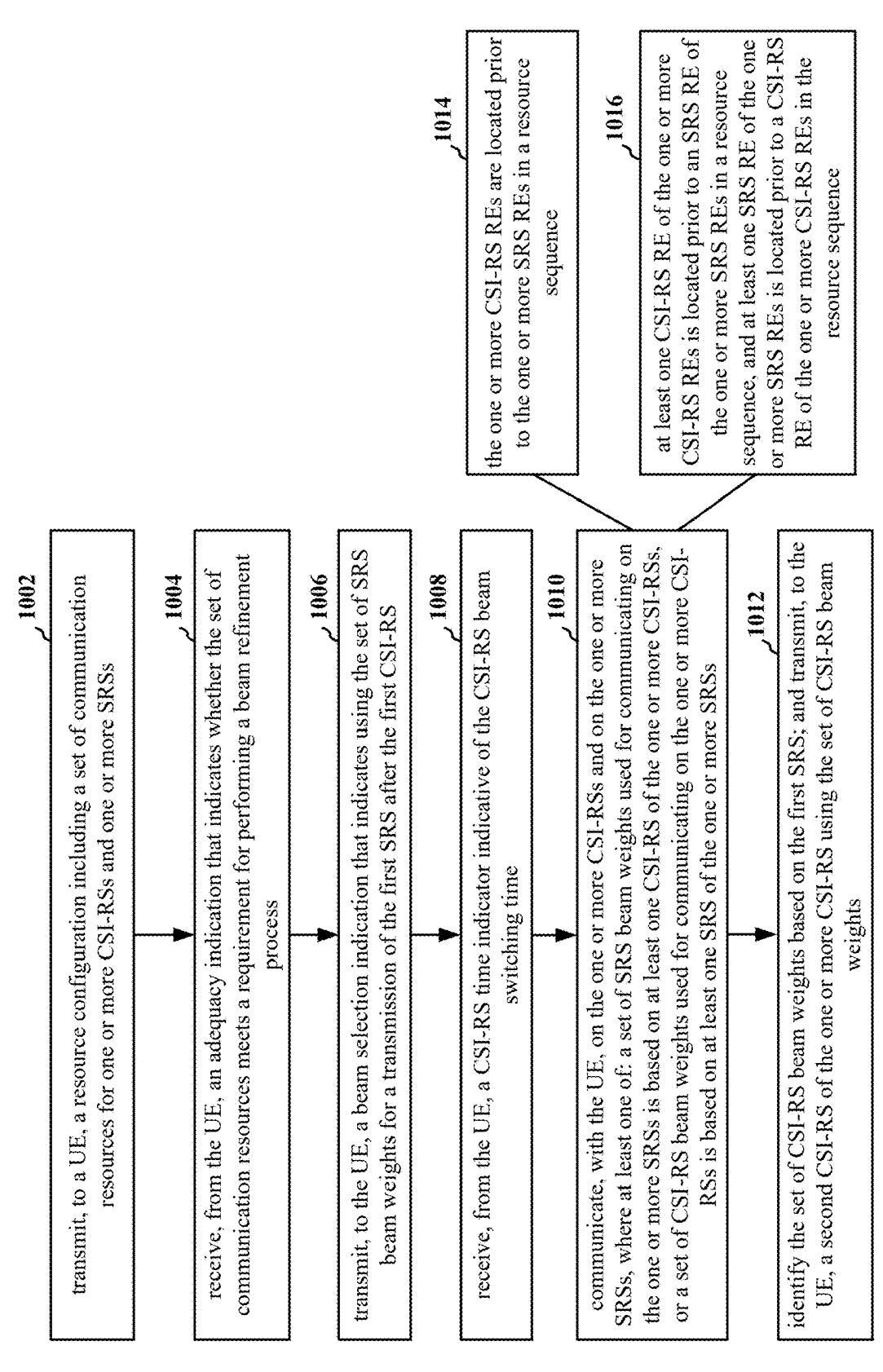

1002 — transmit, to a UE, a resource configuration including a set of communication resources for one or more CSI-RSs and one or more SRSs 1004 — receive, from the UE, an adequacy indication that indicates whether the set of communication resources meets a requirement for performing a beam refinement process 1006 — transmit, to the UE, a beam selection indication that indicates using the set of SRS beam weights for a transmission of the first SRS after the first CSI-RS 1008 — receive, from the UE, a CSI-RS time indicator indicative of the CSI-RS beam switching time 1010 — communicate, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs 1014 — the one or more CSI-RS REs are located prior to the one or more SRS REs in a resource sequence 1016 — at least one CSI-RS RE of the one or more CSI-RS REs is located prior to an SRS RE of the one or more SRS REs in a resource sequence, and at least one SRS RE of the one or more SRS REs is located prior to a CSI-RS RE of the one or more CSI-RS REs in the resource sequence 1012 — identify the set of CSI-RS beam weights based on the first SRS; and transmit, to the UE, a second CSI-RS of the one or more CSI-RS using the set of CSI-RS beam weights

JOINT AND ITERATIVE BEAM REFINEMENT IN MILLIMETER WAVE SYSTEMS

TECHNICAL FIELD

The present disclosure relates generally to communication systems, and more particularly, to methods and apparatus for enabling joint and iterative beam refinement in wireless communication, such as in millimeter wave systems and in systems operating at higher carrier frequencies.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to receive, from a network entity, a resource configuration including a set of communication resources for one or more channel state information-reference signals (CSI-RSs) and one or more sounding reference signals (SRSs); and communicate, with the network entity, on the one or more CSI-RSs and on the one or more SRSs, where a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to transmit, to a UE, a resource configuration including a set of communication resources for one or more CSI-RSs and one or more SRSs; and communicate, with the UE, on the one or more CSI-RSs and on the one or more SRSs, where a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart illustrating methods of wireless communication at a UE in accordance with various aspects of the present disclosure.

FIG. 8 is a flowchart illustrating methods of wireless communication at a UE in accordance with various aspects of the present disclosure.

FIG. 9 is a flowchart illustrating methods of wireless communication at a network entity in accordance with various aspects of the present disclosure.

FIG. 10 is a flowchart illustrating methods of wireless communication at a network entity in accordance with various aspects of the present disclosure.

DETAILED DESCRIPTION

Figure 1:
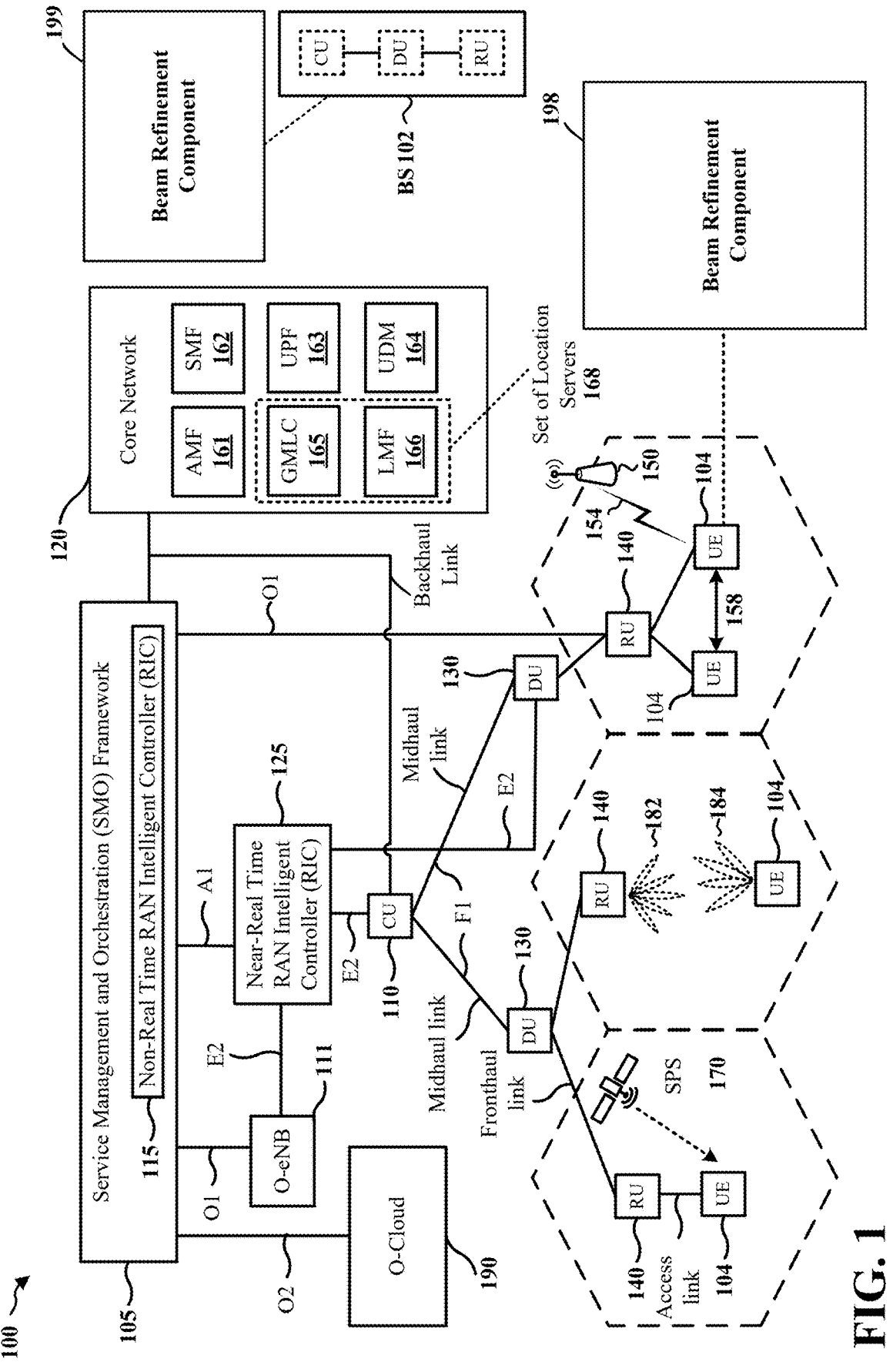
FIG. 1 is a diagram illustrating an example of a wireless communication system and an access network.

In wireless communication systems, such as millimeter wave systems, multiple antennas may be used at both the network side and the user equipment (UE) side for communications. Hence, beamforming from multiple antennas is important to bridge the link budget and achieve efficient wireless communication. Traditional techniques for beamforming rely on codebook-based directional beamforming with beams in the codebook having different beamwidths, where the best beams are selected from a predefined codebook at both transmitting and receiving ends. More recent UE side implementations have started to leverage adaptive or dynamic beam weights, learned in real-time instead of selecting from a fixed codebook, which provides improvements over the codebook-based beamforming approach. Example aspects presented herein provide methods and apparatus for joint beam refinement at both the network side and the UE side via the use of adaptive beam weights.

Various aspects relate generally to wireless communication. Some aspects more specifically relate to methods and apparatus for enabling joint and iterative beam refinement in wireless communication, such as in millimeter wave systems. In some examples, a UE receives, from a network entity, a resource configuration including a set of communication resources for one or more CSI-RSs and one or more SRSs; and communicates with the network entity on the one or more CSI-RSs and on the one or more SRSs, where a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. Some example aspects provide methods for the coordinated transmission of reference signals (RSs), including CSI-RSs and SRSs, taken into consideration the impact of beam switching and processing at both ends. Some example aspects provide the signaling mechanisms for the joint and iterative beam refinement. Some example aspects provide the configuration of RSs to enable iterative beamforming processes.

Particular aspects of the subject matter described in this disclosure can be implemented to realize one or more of the following potential advantages. In some examples, by enabling joint and iterative beam refinement via coordinated transmission of RSs between the transmitting and receiving ends, the described techniques allow on-the-fly beam learning and refinement for a more responsive beamforming approach, thereby enhancing the efficiency and adaptability of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam refinement component 198. The beam refinement component 198 may be configured to receive, from a network entity, a resource configuration including a set of communication resources for one or more CSI-RSs and one or more SRSs; and communicate, with the network entity, on the one or more CSI-RSs and on the one or more SRSs, where a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. In certain aspects, the base station 102 may include a beam refinement component 199. The beam refinement component 199 may be configured to transmit, to a UE, a resource configuration including a set of communication resources for one or more CSI-RSs and one or more SRSs; and communicate, with the UE, on the one or more CSI-RSs and on the one or more SRSs, where a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs. Although the following description may be focused on 5G NR, the concepts described herein may be applicable to other similar areas, such as LTE, LTE-A, CDMA, GSM, and other wireless technologies.

Figures 2A, 2B, 2C, 2D:
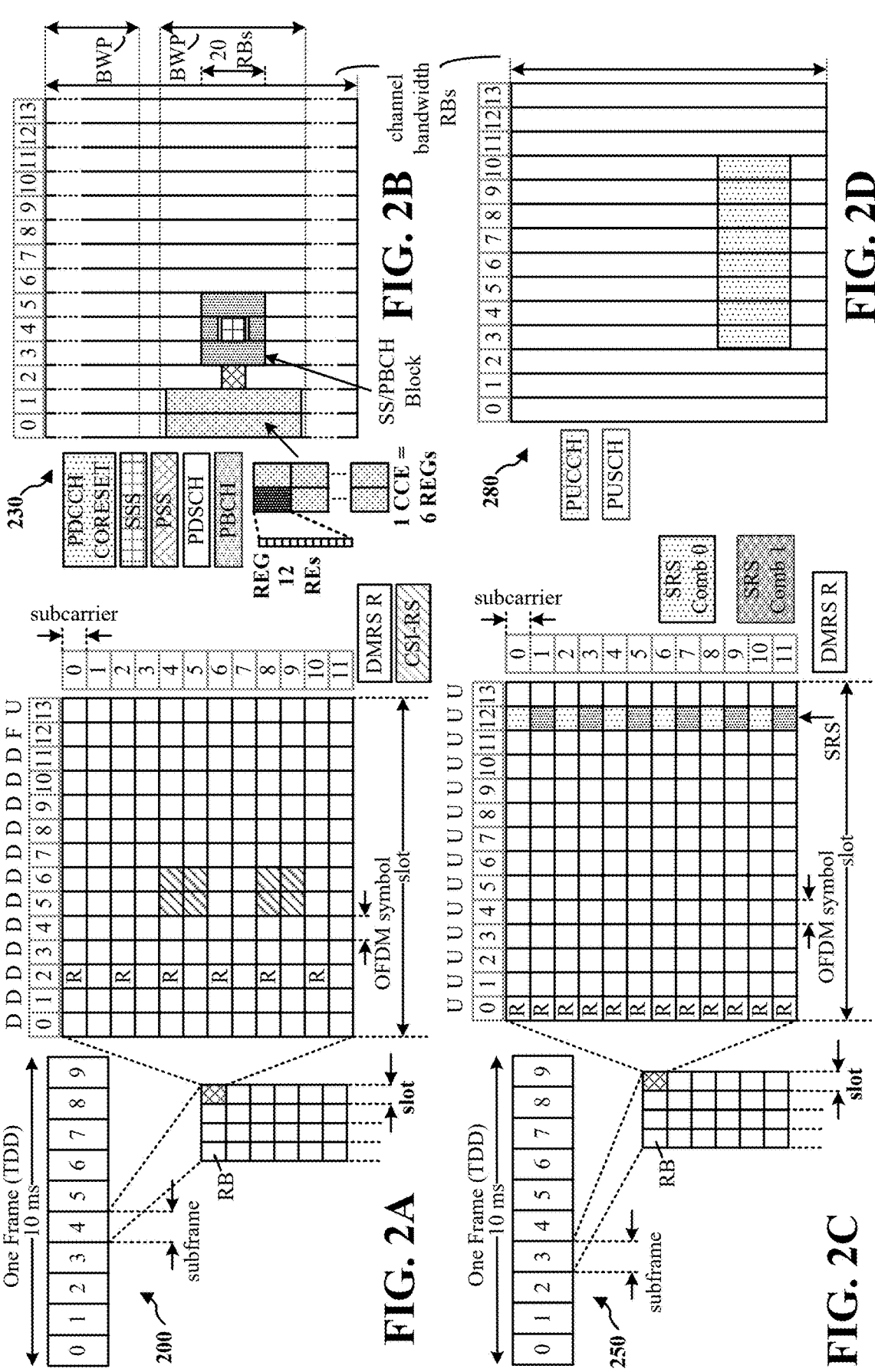
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
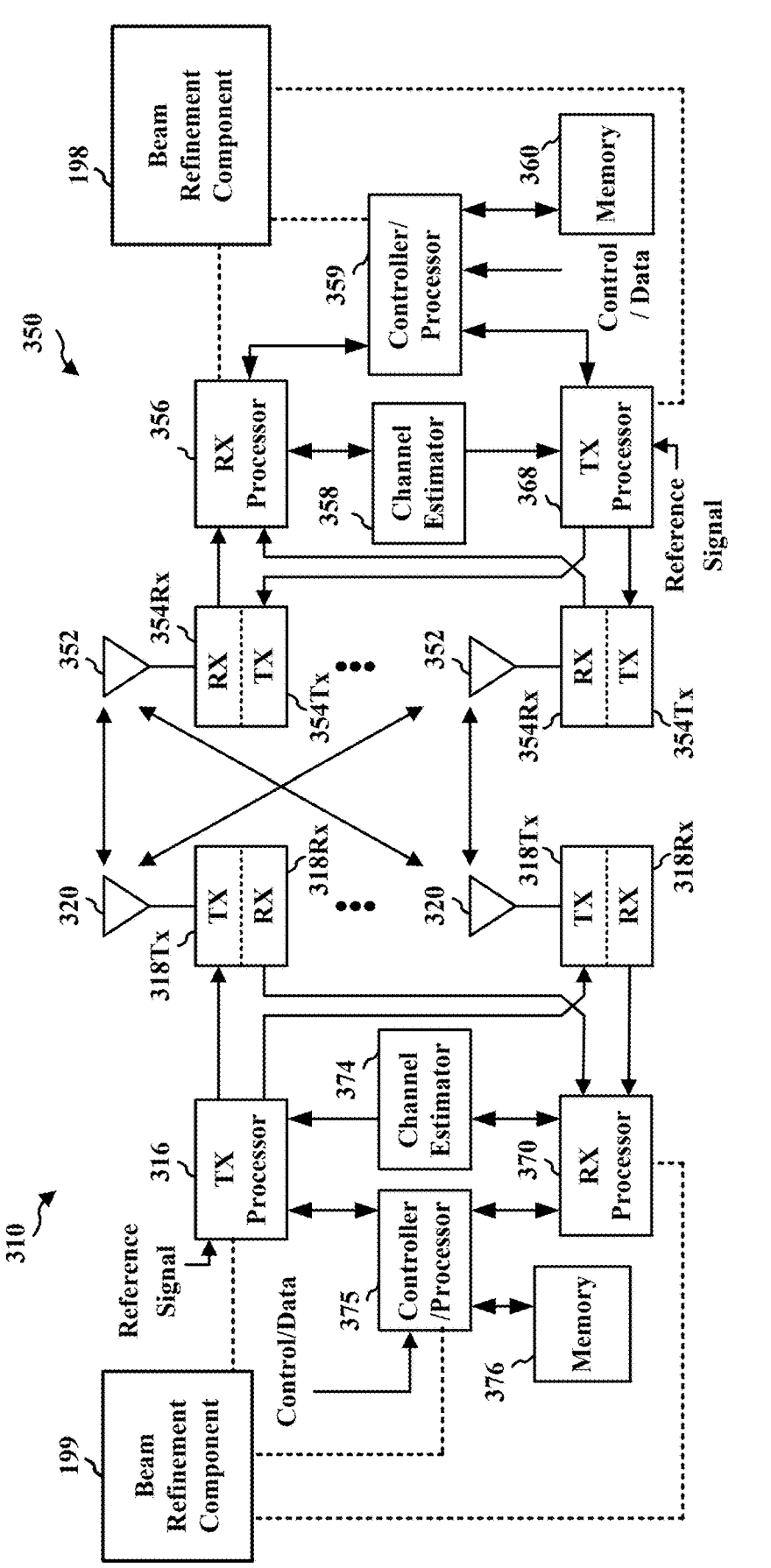
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam refinement component 198 of FIG. 1.

At least one of the TX processor 316, the RX processor 370, and the controller/processor 375 may be configured to perform aspects in connection with the beam refinement component 199 of FIG. 1.

Example aspects provided herein propose joint beam refinement at both sides of the link via the use of adaptive beam weights. Coordinated transmission of RSs (e.g., CSI-RSs and SRSs) and beam switching/processing conditions are discussed. New RS configurations to enable iterative beamforming procedures are also proposed.

In wireless communication systems, such as millimeter wave systems, multiple antennas may be used at both the network side and the user equipment (UE) side for communication. Hence, beamforming from multiple antennas is important to bridge the link budget and achieve efficient wireless communication. Traditional techniques for beamforming rely on codebook-based directional beamforming with different beamwidths, where the best beams are selected from a predefined codebook at both transmitting and receiving ends. More recent UE side implementations have started to leverage adaptive or dynamic beam weights, learned in real-time instead of selecting from a fixed codebook. The adaptive or dynamic beam weights for beamforming bring multiple advantages. Firstly, it enables co-phasing of energy across multiple clusters in the communication channel. Additionally, adaptive beam weights address polarization imbalances arising from differences in material properties, such as those found in UE housing or among different antennas. Moreover, in scenarios where there exist hand blockages, the adaptive beam weights allow for the optimal beam weight selection to constructively add signals blocked by the hands at different antennas.

Example aspects presented herein provide methods and apparatus for the joint beam refinement at both the network side and the UE side of a channel using adaptive beam weights. Some example aspects provide methods for coordinated transmission of RSs, including CSI-RSs and SRSs, taking into consideration the impact of beam switching and processing at both ends to realize the joint beam refinement. Some example aspects provide the signaling mechanisms for the joint and iterative beam refinement. Some example aspects provide the configuration of RSs to enable iterative beamforming processes.

In multiple-input multiple-output (MIMO) wireless communication, the optimal beamforming vector at the transmitter (Tx) side (e.g., the network side in a downlink setting) f is the dominant right singular vector of the channel matrix H, while the optimal beamforming vector at the receiver (Rx) side (e.g., the UE side) g is the dominant left singular vector of the channel matrix H, which is a matched filter to the optimal beamforming at the Tx side. As used herein, the term "transmitter side" (or Tx side) is used interchangeably with the term "transmitter end" (or Tx end), and the term "receiver side" (or Rx side) is used interchangeably with the term "receiver end" (or Rx end). As used herein, a beam weight refers to a complex weight (phase shifter and/or amplitude/gain control settings) that is applied to the transmitter side or the receiver side to realize a certain objective (e.g., steer the direction of the transmitted or received signal beam). For example, different beam weights may correspond to different phase shifter and amplitude/gain control settings. In the MIMO communication that involves multiple antennas, one beam weight may correspond to the signal phase and amplitude setting for one antenna of the multiple antennas. The beamforming vector may refer to a vector that contains the set of complex beam weights, each applied to one antenna of the multiple antennas in a MIMO system.

Hence, to maximize $|g^H Hf|^2$, the optimal beamforming vector at the Tx side, f, is given as: $f_{opt} = v_1(H^H H)$, where $v_1(.)$ denotes the dominant right singular vector and the optimal beamforming vector at the Rx side, g, is given as:

$$g_{opt} = \frac{Hf_{opt}}{\left\|Hf_{opt}\right\|} = u_1(H^H H),$$

where $u_1(.)$ denotes the dominant left singular vector, $A^H$ represents the complex conjugate Hermitian transpose of A. The singular value decomposition of the channel matrix H is given as: $H = U\Lambda V^H$, where $v_1(\bullet)$ and $u_1(\bullet)$ are the unit-norm first columns of V and U, respectively, and the diagonal entries of $\Lambda$ are arranged in a descending order. Hence, $v_1(\bullet)$ and $u_1(\bullet)$ are the dominant singular vectors of H.

In the scenarios where $f_{opt}$ is not used at the Tx side and another beamforming vector f is used, the matched filter structure remains applicable at the Rx side, and the optimal beamforming vector g to be used at the Rx side is:

$$g = \frac{Hf}{\|Hf\|}.$$

Similarly, in the scenarios where the beamforming vector g is used at the Rx side, the corresponding optimal beam f to be used at the Tx side can be expressed as:

$$f = \frac{H^T g}{\|H^T g\|},$$

where $A^T$ represents the transpose of A.

In some aspects, a sequential beam refinement approach is provided for coordinate joint beamforming at both the Tx and Rx sides. In some examples, to coordinate the joint beamforming at the Tx and Rx sides, the network (e.g., a gNB) may configure a coordinated grant (e.g., a set of communication resources) for one or more CSI-RSs and one or more SRSs in a sequential manner. The set of communication resources may include a CSI-RS session, corresponding to the one or more CSI-RSs, and an SRS session, corresponding to the one or more SRSs.

Figure 4:
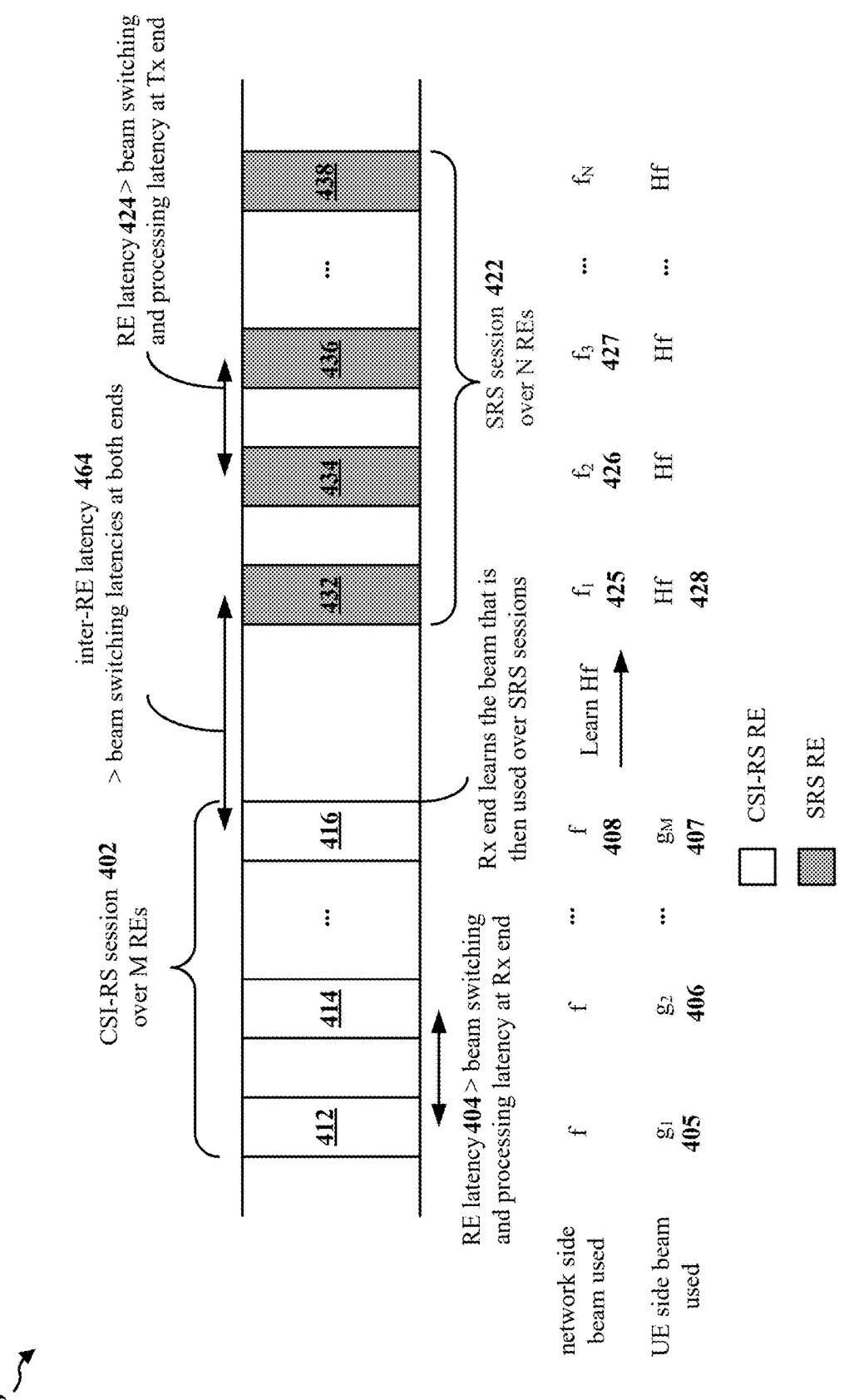
FIG. 4 is a diagram illustrating an example of channel state information-reference signal (CSI-RS) session and sounding reference signal (SRS) session for the joint beamforming in accordance with various aspects of the present disclosure.

FIG. 4 is a diagram 400 illustrating an example of CSI-RS session and SRS session for the joint beamforming in accordance with various aspects of the present disclosure. As shown in FIG. 4, in some aspects, the CSI-RS session 402 may include M resource elements (REs), which may be referred to as CSI-RS REs (e.g., CSI-RS REs 412, 414, and 416) in the time-frequency grid and may be used for beam refinement at the Rx side (UE side). On the other hand, the SRS session 422 may include N REs in the time-frequency grid, which may be referred to as SRS REs (e.g., SRS REs 432, 434, 436, and 438), and may be used for beam refinement at the Tx side (network side). M and N are integer numbers, and they can be the same or distinct.

Within the CSI-RS session 402, the RE latency 404 (i.e., the time interval between neighboring CSI-RS REs, such as CSI-RS REs 412 and 414) is configured to exceed the beam switching and beam synthesis/processing latency as indicated by the Rx side. For example, the RE latency 404 between the CSI-RS REs 412 and 414 should exceed the beam switching time for switching the beams from $g_1$ 405 to $g_2$ 406 at the UE side, in addition to the beam synthesis/ processing latency. This configuration of RE latency 404 allows the beam switching at the Rx side for on-the-fly beam learning throughout the CSI-RS session. Similarly, the RE latency 424 in the SRS session (i.e., the time interval between neighboring SRS REs, such as SRS REs 434 and 436) is configured to exceed the beam switching and synthesis/processing latency at the Tx side. For example, the RE latency 424 between the SRS REs 434 and 436 should exceed the beam switching time for switching the beams from $f_1$ 426 to $f_2$ 427 at the network side, in addition to the beam synthesis/processing latency. This configuration of RE latency 404 allows the beam switching at the Rx side for on-the-fly beam learning throughout the CSI-RS session.

Additionally, the inter-RE latency 464 between the CSI-RS and SRS sessions (i.e., the time interval between adjacent CSI-RS RE (e.g., CSI-RS RE 416) and SRS RE (e.g., SRS RE 432) is configured to accommodate beam switching at both the Tx and Rx sides (e.g., beam switching from Tx to Rx and from Rx to Tx). For example, the inter-RE latency 464 between the CSI-RS RE 416 and the SRS RE 432 may be larger than beam switching time for switching beams from f 408 to f1 425 at the network side, and also larger than the beam switching time for switching beams from gM 407 to Hf 428 at the UE side.

The relative order of the CSI-RS session and the SRS session are flexible and may be configured based on operational needs. In some aspects, as illustrated in FIG. 4, the CSI-RS session 402 may be configured prior to the SRS session 422. In some other aspects, the sequence may be inverted, with the SRS session being configured prior to the CSI-RS session. In some aspects, the CSI-RS session may be interlaced with the SRS session. In some aspects, the sequence of CSI-RS session and SRS session can be repeated as necessary to meet specific beam refinement needs.

In some aspects, signaling mechanisms are provided to accommodate the joint beamforming at the Tx and Rx sides. In some aspects, the network (e.g., the gNB) may provide a resource configuration indicating the set of resources configured for the CSI-RS and SRS sessions (e.g., CSI-RS REs 412, 414, 416; SRS REs 432, 434, 436, 438). On the UE side, after receiving the resource configuration, the UE may provide feedback, indicating whether the configured REs are sufficient to meet the UE hardware and processing requirements (e.g., meet the condition for performing a beam refinement process). For example, referring to FIG. 4, the UE may indicate whether the configured REs (e.g., CSI-RS REs 412, 414, and 416) provide sufficient RE latency 404 for the beam switching (e.g., beam switching from beam $g_1$ 405 to beam $g_2$ 406) at the UE side. In some aspects, the network (e.g., the gNB) may explicitly indicate that the beam learned at the UE side at the end of the CSI-RS session (e.g., Hf 428) be used during the SRS session (e.g., SRS session 422) for transmitting the SRSs.

Figure 5:
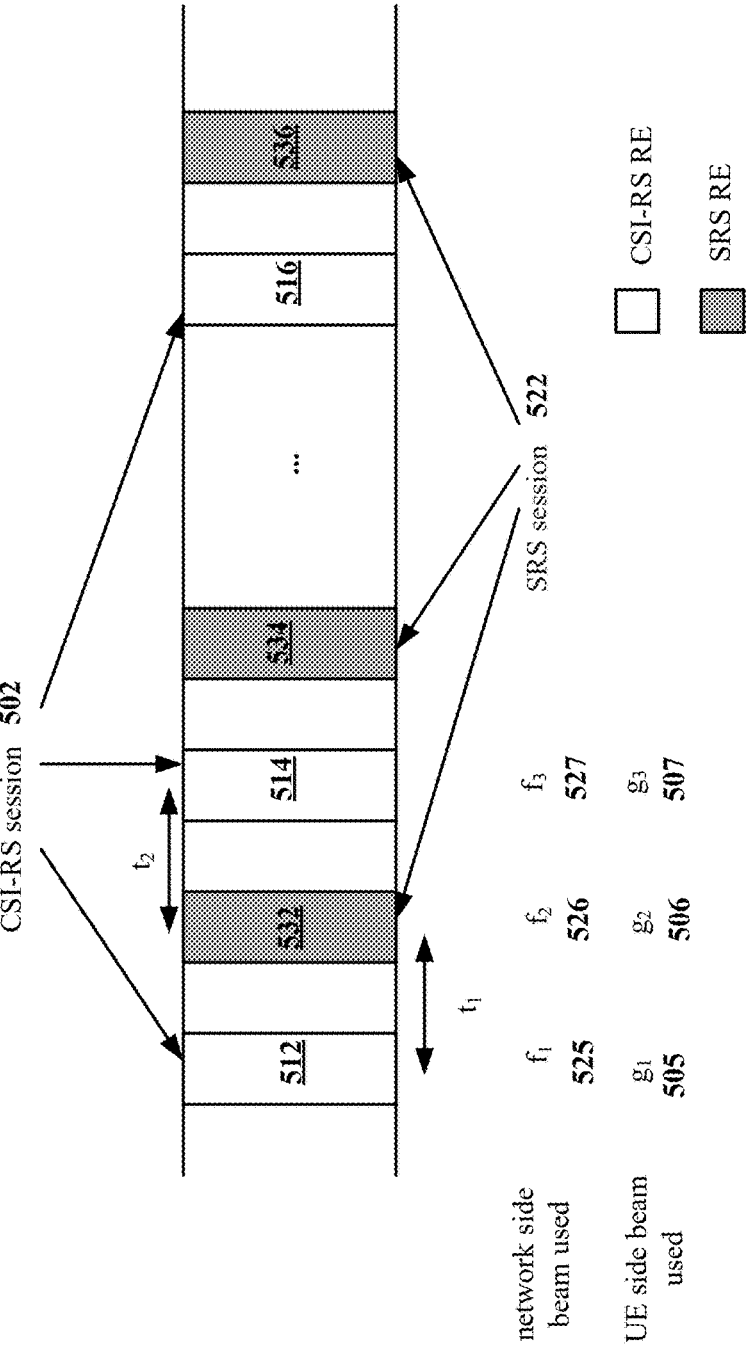
FIG. 5 is a diagram illustrating an example of interlaced CSI-RS session and SRS session for the joint beamforming in accordance with various aspects of the present disclosure.

In some aspects, the CSI-RS REs of the CSI-RS session may be interlaced with the SRS REs in the SRS session. FIG. 5 is a diagram 500 illustrating an example of the interlaced CSI-RS and SRS sessions for the joint beamforming in accordance with various aspects of the present disclosure. As shown in FIG. 5, the CSI-RS session 502 may include one or more CSI-RS REs, such as CSI-RS REs 512, 514, and 516, and the SRS session 522 may include one or more SRS REs, such as SRS REs 532, 534, and 536. The CSI-RS REs (e.g., CSI-RS REs 512, 514, and 516) and the SRS REs (e.g., SRS REs 532, 534, and 536) may be interlaced with each other. The inter-RE latency between the CSI-RS and SRS REs, such as the time interval $t_1$ between CSI-RS RE 512 and SRS RE 532, or the time interval $t_2$ between the SRS RE 532 and the CSI-RS RE 514, are configured to accommodate beam switching at both the Tx and Rx sides (e.g., beam switching from Tx to Rx and from Rx to Tx).

The interlaced CSI-RS and SRS sessions allow the iterative beamforming procedure that includes the sequential exchange of beams between the Tx side (e.g., Tx node) and the Rx side (e.g., Rx node). By doing so, both Tx side and Rx side may iteratively update, eventually converging to the optimal beamforming vectors at their respective sides. For example, as shown in FIG. 5, through the sequential exchange of beams at CSI-RS REs 512, 514 and SRS RE 532, the beamforming vector at the UE side may converge from $g_1$ 505, to $g_2$ 506, and finally to $g_3$ 507. Similarly, the beamforming vector at the network side may converge from $f_1$ 525, to $f_2$ 526, and then to $f_3$ 527. In some examples, this iterative beamforming procedure may be applied in scenarios where an initial adaptive beam weight estimate is made at both the Tx sides and the Rx sides, and the initial adaptive beam weight estimate is then subjected to iterations, leading to a refined beam weight estimation.

Regarding the signaling mechanism involved in interlaced CSI-RS and SRS REs, the network (e.g., the gNB) may first configure an interlaced combination of the CSI-RS session (e.g., CSI-RS session 502) and the SRS session (e.g., SRS session 522). Then, the UE may indicate whether the designated REs are sufficient to meet the UE hardware and processing conditions. For example, the UE may indicate whether the inter-RE latency (e.g., the time interval $t_1$) is sufficient for the beam switching at the UE side. In the CSI-RS session (e.g., CSI-RS REs 512, 514, and 516), the network (e.g., the gNB) may transmit (e.g., a CSI-RS) while the UE is the receiver. In contrast, in the SRS session (e.g., SRS REs 532, 534, and 536), the UE may transmit (e.g., an SRS) with the beam learned from the preceding CSI-RS session and the network (e.g., the gNB) is the receiver. In some examples, the network (e.g., the gNB) may explicitly indicate the UE to use the beam learned from the CSI-RS session for the transmission in the SRS session. For example, the network (e.g., the gNB) may explicitly indicate that the UE uses the beam learned from the CSI-RS RE 512 for the transmission of SRS in the SRS RE 532.

Figure 6:
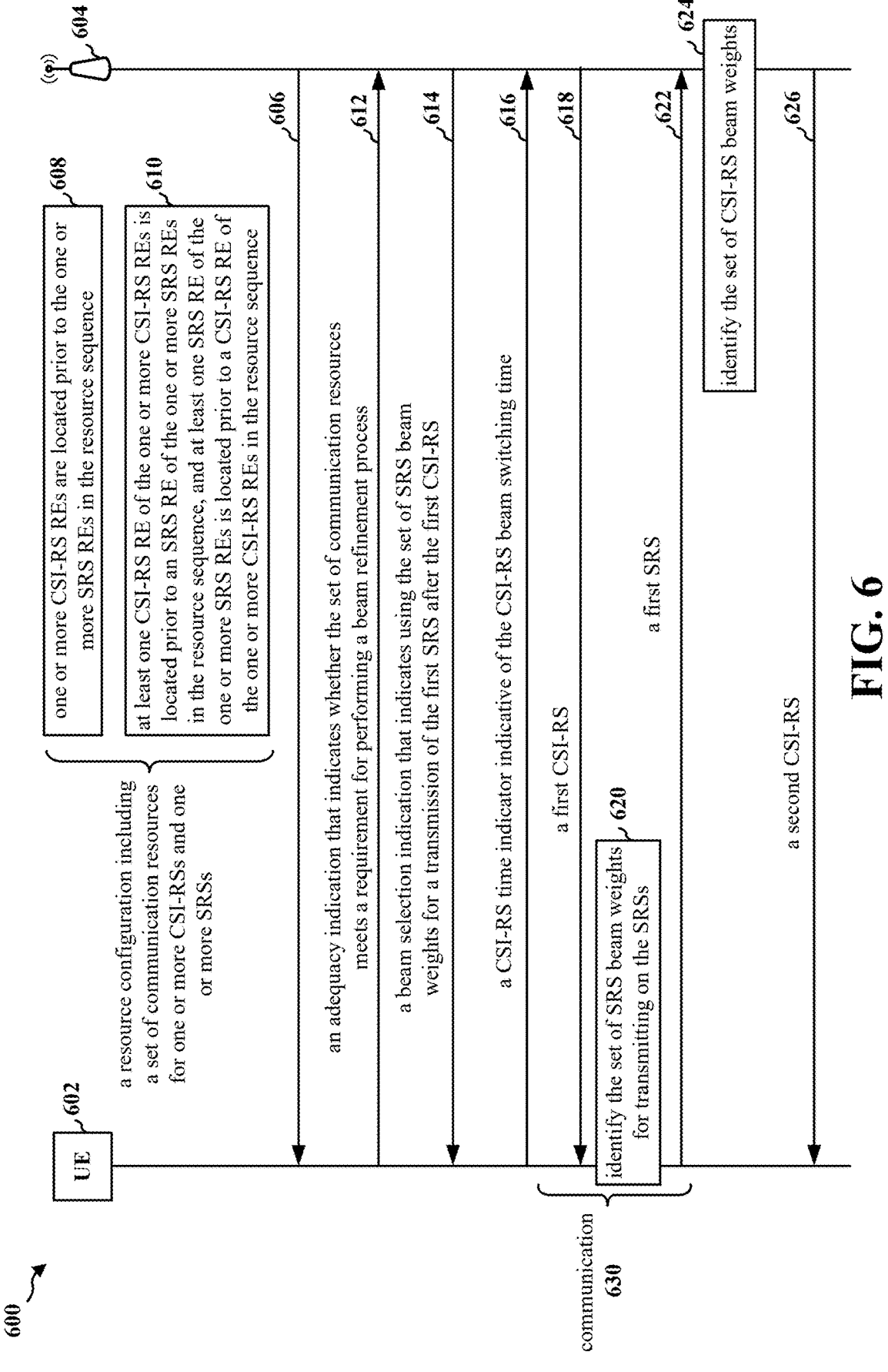
FIG. 6 is a call flow diagram illustrating a method of wireless communication in accordance with various aspects of the present disclosure.

FIG. 6 is a call flow diagram 600 illustrating a method of wireless communication in accordance with various aspects of this present disclosure. Various aspects are described in connection with a UE 602 and a base station 604. The aspects may be performed by the UE 602 or the base station 604 in aggregation and/or by one or more components of a base station 604 (e.g., such as a CU 110, a DU 130, and/or an RU 140).

As shown in FIG. 6, at 606, a UE 602 may receive, from base station 604, a resource configuration including a set of communication resources for one or more CSI-RSs and one or more SRSs. In some examples, the set of communication resources may include one or more CSI-RS REs respectively corresponding to the one or more CSI-RS REs (e.g., CSI-RS REs 412, 414, 416, 512, 514, 516) and one or more SRS REs (e.g., SRS REs 432, 434, 436, 438, 532, 534, 536) respectively corresponding to the one or more SRSs. The relative positions of the CSI-RS REs and the SRS REs may vary based on different configurations. In some examples, at 608, the one or more CSI-RS REs may be located prior to the one or more SRS REs in the resource sequence, as illustrated in FIG. 4. In some examples, at 610, at least one CSI-RS RE (e.g., CSI-RS RE 512) of the one or more CSI-RS REs is located prior to an SRS RE (e.g., SRS RE 532) of the one or more SRS REs in the resource sequence, and at least one SRS RE (e.g., SRS RE 532) of the one or more SRS REs is located prior to a CSI-RS RE (e.g., CSI-RS RE 514) of the one or more CSI-RS REs in the resource sequence, as illustrated in FIG. 5. In some other aspects, the one or more SRS REs may be located prior to the one or more CSI-RS REs in the resource sequence.

At 612, the UE 602 may transmit, to the base station 604 in response to the resource configuration, an adequacy indication. The adequacy indication may indicate whether the set of communication resources meets a condition for performing a beam refinement process. For example, referring to FIG. 4, the UE may indicate whether the configured REs (e.g., CSI-RS REs 412, 414, and 416) provide sufficient RE latency 404 for the beam switching (e.g., beam switching from beam $g_1$ 405 to beam $g_2$ 406) at the UE side.

At 614, the UE 602 may receive, from base station 604, a beam selection indication that indicates using the set of SRS beam weights for a transmission of the first SRS after the first CSI-RS. For example, referring to FIG. 4, the network (e.g., the gNB) may explicitly indicate the UE to use the beam learned at the CSI-RS session (e.g., Hf 428) for transmitting the SRS (e.g., at SRS RE 432).

At 616, the UE 602 may transmit, to base station 604, a CSI-RS time indicator indicative of the receiver gap. For example, the UE may transmit to base station a CSI-RS time indicator indicative of the receiver gap between the CSI-RS REs 412 and 414.

At 630, the UE 602 and the base station 604 may communicate on the one or more CSI-RSs and on the one or more SRSs. During the communication at 630, a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. During the communication 630, the base station 604 may transmit one or more CSI-RSs to the UE 602, and the UE 602 may transmit one or more SRSs to the base station 604. The UE 602 may adjust the adaptive beam weights for transmitting the SRS based on the received CSI-RS, and the base station 604 may adjust the adaptive beam weights for transmitting the CSI-RS based on the received SRS. In some examples, all the CSI-RSs may be transmitted before all the SRSs, as illustrated in FIG. 4. In some examples, all the SRSs may be transmitted before all the CSI-RSs. In some examples, the transmission of CSI-RSs may be interlaced with the transmission of the SRSs, as illustrated in FIG. 5. One example of the communication 630 includes 618 to 622.

At 618, the base station 604 may transmit a first CSI-RS to the UE 602. For example, referring to FIG. 4, the first CSI-RS may include one or more CSI-RSs transmitted to the UE at CSI-RS REs 412, 414, or 416.

At 620, the UE 602 may identify, based on the first CSI-RS, the set of SRS beam weights for transmitting on the SRSs. For example, the UE may identify, based on the first CSI-RS, the set of SRS beam weights (Hf) for transmitting on the SRSs.

At 622, the UE 602 may transmit, to base station 604 using the set of SRS beam weights (identified at 620), a first SRS after the first CSI-RS. For example, referring to FIG. 4, the UE may transmit, to base station using the set of SRS beam weights (Hf), a first SRS (e.g., at SRS RE 432) after the first CSI-RS.

At 624, the base station 604 may identify the set of CSI-RS beam weights based on the first SRS. For example, referring to FIG. 5, the first SRS may be SRS transmitted via SRS RE 532, and the base station may identify the set of CSI-RS beam weights (e.g., $f_3$ 527) based on the first SRS.

At 626, the base station 604 may transmit, to the UE 602, a second CSI-RS of the one or more CSI-RS using the set of CSI-RS beam weights. For example, referring to FIG. 5, the base station may transmit to the UE a second CSI-RS at CSI-RS RE 514 using the set of CSI-RS beam weights (e.g., $f_3$ 527).

FIG. 7 is a flowchart 700 illustrating methods of wireless communication at a UE in accordance with various aspects of the present disclosure. The method may be performed by a UE. The UE may be the UE 104, 350, 602, or the apparatus 1104 in the hardware implementation of FIG. 11. By enabling joint and iterative beam refinement via coordinated transmission of RSs between the transmitting and receiving ends, the methods allow on-the-fly beam learning and refinement for a more responsive beamforming approach, thereby enhancing the efficiency and adaptability of wireless communication.

As shown in FIG. 7, at 702, the UE may receive, from a network entity, a resource configuration including a set of communication resources for one or more CSI-RSs and one or more SRSs. The network entity may be a base station, or a component of a base station, in the access network of FIG. 1 or a core network component (e.g., base station 102, 310, 604; or the network entity 1102 in the hardware implementation of FIG. 11). FIGS. 4, 5, and 6 illustrate various aspects of the steps in connection with flowchart 700. For example, referring to FIG. 6, the UE 602 may receive, at 606, from a network entity (base station 604), a resource configuration including a set of communication resources for one or more CSI-RSs and one or more SRSs. In some aspects, 702 may be performed by the beam refinement component 198.

At 704, the UE may communicate, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. For example, referring to FIG. 6, the UE 602 may, at 618 and 622, communicate with the network entity (base station 604) on the one or more CSI-RSs (at 618) and on the one or more SRSs (at 622). Referring to FIG. 4, a set of SRS beam weights used for communicating on the one or more SRSs (e.g., at SRS RE 432) is based on at least one CSI-RS of the one or more CSI-RSs. Referring to FIG. 5, a set of CSI-RS beam weights used for communicating on the one or more CSI-RSs (e.g., at CSI-RS RE 514) is based on at least one SRS of the one or more SRSs prior to the one or more CSI-RSs in a resource sequence. In some aspects, 704 may be performed by the beam refinement component 198.

FIG. 8 is a flowchart 800 illustrating methods of wireless communication at a UE in accordance with various aspects of the present disclosure. The method may be performed by a UE. The UE may be the UE 104, 350, 602, or the apparatus 1104 in the hardware implementation of FIG. 11. By enabling joint and iterative beam refinement via coordinated transmission of RSs between the transmitting and receiving ends, the methods allow on-the-fly beam learning and refinement for a more responsive beamforming approach, thereby enhancing the efficiency and adaptability of wireless communication.

As shown in FIG. 8, at 802, the UE may receive, from a network entity, a resource configuration including a set of communication resources for one or more CSI-RSs and one or more SRSs. The network entity may be a base station, or a component of a base station, in the access network of FIG. 1 or a core network component (e.g., base station 102, 310, 604; or the network entity 1102 in the hardware implementation of FIG. 11). FIGS. 4, 5, and 6 illustrate various aspects of the steps in connection with flowchart 800. For example, referring to FIG. 6, the UE 602 may receive, at 606, from a network entity (base station 604), a resource configuration including a set of communication resources for one or more CSI-RSs and one or more SRSs. In some aspects, 802 may be performed by the beam refinement component 198.

At 810, the UE may communicate, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. For example, referring to FIG. 6, the UE 602 may, at 618 and 622, communicate with the network entity (base station 604) on the one or more CSI-RSs (at 618) and on the one or more SRSs (at 622). Referring to FIG. 4, a set of SRS beam weights used for communicating on the one or more SRSs (e.g., at SRS RE 432) is based on at least one CSI-RS of the one or more CSI-RSs. Referring to FIG. 5, a set of CSI-RS beam weights used for communicating on the one or more CSI-RSs (e.g., at CSI-RS RE 514) is based on at least one SRS of the one or more SRSs prior to the one or more CSI-RSs in a resource sequence. In some aspects, 810 may be performed by the beam refinement component 198.

In some aspects, at 804, the UE may transmit, to the network entity in response to the resource configuration, an adequacy indication that indicates whether the set of communication resources meets a condition for performing a beam refinement process. To communicate on the one or more CSI-RSs and on the one or more SRSs (at 810), the UE may communicate, in response to the adequacy indication indicating the set of communication resources meeting the condition, on the one or more CSI-RSs and on the one or more SRSs. For example, referring to FIG. 4 and FIG. 6, the UE may indicate, at 612, whether the configured REs (e.g., CSI-RS REs 412, 414, and 416) provide sufficient RE latency 404 for the beam switching (e.g., beam switching from beam $g_1$ 405 to beam $g_2$ 406) at the UE side, and the UE 602 may communicate, in response to the adequacy indication indicating the set of communication resources meeting the condition, on the one or more CSI-RSs (e.g., at 618) and on the one or more SRSs (e.g., at 622). In some aspects, 804 may be performed by the beam refinement component 198.

In some aspects, the set of communication resources (at 802) may include one or more CSI-RS resource elements (REs) respectively corresponding to the one or more CSI-RSs and one or more SRS REs respectively corresponding to the one or more SRSs. For example, referring to FIG. 4, the set of communication resources may include one or more CSI-RS REs (e.g., CSI-RS REs 412, 414, and 416) respectively corresponding to the one or more CSI-RSs and one or more SRS REs (e.g., SRS REs 432, 434, 436, and 438) respectively corresponding to the one or more SRSs.

In some aspects, the set of SRS beam weights used for communicating on the one or more SRSs (at 810) may be based on the at least one CSI-RS of the one or more CSI-RSs. To communicate on the one or more CSI-RSs and on the one or more SRSs (at 810), the UE may receive, from the network entity, a first CSI-RS of the one or more CSI-RSs; identify, based on the first CSI-RS, the set of SRS beam weights for transmitting on the SRSs; and transmit, to the network entity using the set of SRS beam weights, a first SRS of the one or more SRSs after the first CSI-RS. For example, referring to FIG. 4, the set of SRS beam weights used for communicating on the one or more SRSs (at SRS RE 432) may be based on the at least one CSI-RS of the one or more CSI-RSs. Referring to FIG. 6, the UE 602 may receive, at 618, from the network entity (base station 604), a first CSI-RS of the one or more CSI-RSs, identify, at 620, based on the first CSI-RS, the set of SRS beam weights for transmitting on the SRSs, and transmit, at 622, to the network entity (base station 604) using the set of SRS beam weights, a first SRS of the one or more SRSs after the first CSI-RS.

In some aspects, to identify the set of SRS beam weights, the UE may identify, based on the first CSI-RS, the set of SRS beam weights corresponding to different phase shifter and amplitude control settings to use over an antenna array associated with the UE. For example, referring to FIG. 6, to identify the set of SRS beam weights at 620, the UE 602 may identify, based on the first CSI-RS (at 618), the set of SRS beam weights corresponding to different phase shifter and amplitude control settings to use over an antenna array associated with the UE 602.

In some aspects, at 806, the UE may receive, from the network entity, a beam selection indication that indicates using the set of SRS beam weights for a transmission of the first SRS after the first CSI-RS. For example, referring to FIG. 6, the UE 602 may receive, at 614, from the network entity (base station 604), a beam selection indication that indicates using the set of SRS beam weights for a transmission of the first SRS after the first CSI-RS. In some aspects, 806 may be performed by the beam refinement component 198.

In some aspects, at 814, the one or more CSI-RS REs are located prior to the one or more SRS REs in the resource sequence. For example, referring to FIG. 4, the one or more CSI-RS REs (e.g., CSI-RS REs 412, 414, and 416) are located prior to the one or more SRS REs (e.g., SRS REs 432, 434, 436, and 438) in the resource sequence.

In some aspects, a first latency between neighboring CSI-RS REs of the one or more CSI-RS REs is longer than a receiver gap, and a second latency between neighboring SRS REs of the one or more SRS REs is longer than a transmitter gap. For example, referring to FIG. 4, the first latency between neighboring CSI-RS REs (e.g., between REs 412 and 414) of the one or more CSI-RS REs is longer than a receiver gap, which may include the beam switching time for switching the beam (beam weights) from $g_1$ 405 to $g_2$ 406 and the beam synthesis and processing time at the UE side. A second latency between neighboring SRS REs (e.g., between REs 434 and 436) of the one or more SRS REs is longer than a transmitter gap, which may include the beam switching time for switching the beam (beam weights) from $f_2$ 426 to beam $f_3$ 427 and the beam synthesis and processing time at the network side.

In some aspects, at 808, the UE may transmit, to the network entity, a CSI-RS time indicator indicative of the receiver gap. For example, referring to FIG. 6, the UE 602 may transmit, at 616, to the network entity (base station

604), a CSI-RS time indicator indicative of the receiver gap. In some aspects, 808 may be performed by the beam refinement component 198.

In some aspects, an inter-RE latency between a last CSI-RS RE of the one or more CSI-RS REs and a first SRS RE of the one or more SRS REs is longer than a receiver gap and longer than a transmitter gap. For example, referring to FIG. 4, an inter-RE latency between a last CSI-RS RE 416 of the one or more CSI-RS REs and a first SRS RE 432 of the one or more SRS REs is longer than a receiver gap and longer than a transmitter gap. The receiver gap may include the beam switching time for switching the beam (beam weights) and the beam synthesis and processing time at the UE side, and the transmitter gap may include the beam switching time for switching the beam (beam weights) and the beam synthesis and processing time at the network side.

In some aspects, at 816, at least one CSI-RS RE of the one or more CSI-RS REs is located prior to an SRS RE of the one or more SRS REs in the resource sequence, and at least one SRS RE of the one or more SRS REs is located prior to a CSI-RS RE of the one or more CSI-RS REs in the resource sequence. For example, referring to FIG. 5, at least one CSI-RS RE (e.g., CSI-RS RE 512) of the one or more CSI-RS REs is located prior to an SRS RE (e.g., SRS RE 532) of the one or more SRS REs in the resource sequence, and at least one SRS RE (e.g., at SRS RE 532) of the one or more SRS REs is located prior to a CSI-RS RE (e.g., CSI-RS RE 514) of the one or more CSI-RS REs in the resource sequence.

In some aspects, a first latency between neighboring CSI-RS REs of the one or more CSI-RS REs is longer than a receiver gap, a second latency between neighboring SRS REs of the one or more SRS REs is longer than a transmitter gap, and an inter-RE latency between a CSI-RS RE and an SRS RE is longer than the receiver gap and longer than the transmitter gap. For example, referring to FIG. 4, the first latency between neighboring CSI-RS REs (e.g., between REs 412 and 414) is longer than a receiver gap, which may include the beam switching time for switching the beam (beam weights) from $g_1$ 405 to $g_2$ 406 and the beam synthesis and processing time at the UE side. A second latency between neighboring SRS REs (e.g., between REs 434 and 436) is longer than a transmitter gap, which may include the beam switching time for switching the beam (beam weights) from $f_2$ 426 to beam $f_3$ 427 and the beam synthesis and processing time at the network side. Referring to FIG. 5, the inter-RE latency between a CSI-RS RE 512 and an SRS RE 532 is longer than the receiver gap and longer than the transmitter gap.

In some aspects, at 812, the UE may receive, from the network entity, a second CSI-RS of the one or more CSI-RS after the first CSI-RS using the set of CSI-RS beam weights, where the set of CSI-RS beam weights is based on the first SRS. For example, referring to FIG. 6, the UE 602 may receive, at 626, from the network entity (base station 604), a second CSI-RS of the one or more CSI-RS after the first CSI-RS (at 618) using the set of CSI-RS beam weights. Referring to FIG. 5, the set of CSI-RS beam weights $f_3$ 527 is based on the first SRS (at SRS RE 532). In some aspects, 812 may be performed by the beam refinement component 198.

In some aspects, the set of CSI-RS beam weights for communicating on the one or more CSI-RSs is based on the at least one SRS of the one or more SRSs prior to the one or more CSI-RSs in the resource sequence, and where the one or more SRS REs are located prior to the one or more CSI-RS REs in the resource sequence. For example, referring to FIG. 5, the set of CSI-RS beam weights (e.g., $f_3$ 527) for communicating on the one or more CSI-RSs is based on the at least one SRS of the one or more SRSs (e.g., at SRS RE 532) prior to the one or more CSI-RSs in the resource sequence. In some examples, the one or more SRS REs may be located prior to the one or more CSI-RS REs in the resource sequence.

FIG. 9 is a flowchart 900 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). By enabling joint and iterative beam refinement via coordinated transmission of RSs between the transmitting and receiving ends, the methods allow on-the-fly beam learning and refinement for a more responsive beamforming approach, thereby enhancing the efficiency and adaptability of wireless communication.

As shown in FIG. 9, at 902, the network entity may transmit, to a UE, a resource configuration including a set of communication resources for one or more CSI-RSs and one or more SRSs. The UE may be the UE 104, 350, 602, or the apparatus 1104 in the hardware implementation of FIG. 11. FIGS. 4, 5, and 6 illustrate various aspects of the steps in connection with flowchart 900. For example, referring to FIG. 6, the network entity (base station 604) may transmit, at 606, to a UE 602, a resource configuration including a set of communication resources for one or more CSI-RSs and one or more SRSs. In some aspects, 902 may be performed by the beam refinement component 199.

At 904, the network entity may communicate, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs. For example, referring to FIG. 6, the network entity (base station 604) may, at 618 and 622, communicate, with the UE 602, on the one or more CSI-RSs (at 618) and on the one or more SRSs (at 622). Referring to FIG. 4, a set of SRS beam weights used for communicating on the one or more SRSs (e.g., at SRS RE 432) is based on at least one CSI-RS of the one or more CSI-RSs. Referring to FIG. 5, a set of CSI-RS beam weights used for communicating on the one or more CSI-RSs (e.g., at CSI-RS RE 514) is based on at least one SRS of the one or more SRSs prior to the one or more CSI-RSs in a resource sequence. In some aspects, 904 may be performed by the beam refinement component 199.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 604; or the network entity 1102 in the hardware implementation of FIG. 11). By enabling joint and iterative beam refinement via coordinated transmission of RSs between the transmitting and receiving ends, the methods allow on-the-fly beam learning and refinement for a more responsive beamforming approach, thereby enhancing the efficiency and adaptability of wireless communication.

As shown in FIG. 10, at 1002, the network entity may transmit, to a UE, a resource configuration including a set of communication resources for one or more CSI-RSs and one or more SRSs. The UE may be the UE 104, 350, 602, or the apparatus 1104 in the hardware implementation of FIG. 11. FIGS. 4, 5, and 6 illustrate various aspects of the steps in connection with flowchart 1000. For example, referring to FIG. 6, the network entity (base station 604) may transmit, at 606, to a UE 602, a resource configuration including a set of communication resources for one or more CSI-RSs and one or more SRSs. In some aspects, 1002 may be performed by the beam refinement component 199.

At 1010, the network entity may communicate, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs. For example, referring to FIG. 6, the network entity (base station 604) may, at 618 and 622, communicate, with the UE 602, on the one or more CSI-RSs (at 618) and on the one or more SRSs (at 622). Referring to FIG. 4, a set of SRS beam weights used for communicating on the one or more SRSs (e.g., at SRS RE 432) is based on at least one CSI-RS of the one or more CSI-RSs. Referring to FIG. 5, a set of CSI-RS beam weights used for communicating on the one or more CSI-RSs (e.g., at CSI-RS RE 514) is based on at least one SRS of the one or more SRSs prior to the one or more CSI-RSs in a resource sequence. In some aspects, 1010 may be performed by the beam refinement component 199.

In some aspects, at 1004, the network entity may receive, from the UE, an adequacy indication that indicates whether the set of communication resources meets a condition for performing a beam refinement process. To communicate on the one or more CSI-RSs and on the one or more SRSs (at 1010), the network entity may communicate, in response to the adequacy indication indicating the set of communication resources meeting the condition, on the one or more CSI-RSs and on the one or more SRSs. For example, referring to FIG. 4 and FIG. 6, the network entity (base station 604) may receive, at 612, from the UE 602, an adequacy indication that indicates whether the set of communication resources meets a condition for performing a beam refinement process. For example, the UE may indicate whether the configured REs (e.g., CSI-RS REs 412, 414, and 416) provide sufficient RE latency 404 for the beam switching (e.g., beam switching from beam $g_1$ 405 to beam $g_2$ 406) at the UE side, and the base station 604 may communicate, in response to the adequacy indication indicating the set of communication resources meeting the condition, on the one or more CSI-RSs (e.g., at 618) and on the one or more SRSs (e.g., at 622). In some aspects, 1004 may be performed by the beam refinement component 199.

In some aspects, the set of communication resources includes one or more CSI-RS resource elements (REs) respectively corresponding to the one or more CSI-RSs and one or more SRS REs respectively corresponding to the one or more SRSs. For example, referring to FIG. 4, the set of communication resources may include one or more CSI-RS REs (e.g., CSI-RS REs 412, 414, and 416) respectively corresponding to the one or more CSI-RSs and one or more SRS REs (e.g., SRS REs 432, 434, 436, and 438) respectively corresponding to the one or more SRSs.

In some aspects, the set of SRS beam weights used for communicating on the one or more SRSs (at 1010) is based on the at least one CSI-RS of the one or more CSI-RSs. To communicate on the one or more CSI-RSs and on the one or more SRSs (at 1010), the network entity may transmit, to the UE, a first CSI-RS of the one or more CSI-RSs; and receive, from the UE, a first SRS of the one or more SRSs after the first CSI-RS, where the first SRS is transmitted using the set of SRS beam weights based on the first CSI-RS. For example, referring to FIG. 4, the set of SRS beam weights used for communicating on the one or more SRSs (at SRS RE 432) may be based on the at least one CSI-RS of the one or more CSI-RSs. Referring to FIG. 6, the network entity (base station 604) may transmit, at 618, to the UE 602, a first CSI-RS of the one or more CSI-RSs, and receive, at 622, from the UE 602 the first SRS, where the first SRS is transmitted using the set of SRS beam weights based on the first CSI-RS.

In some aspects, at 1006, the network entity may transmit, to the UE, a beam selection indication that indicates using the set of SRS beam weights for a transmission of the first SRS after the first CSI-RS. For example, referring to FIG. 6, the network entity (base station 604) may transmit, at 614, to the UE 602, a beam selection indication that indicates using the set of SRS beam weights for a transmission of the first SRS after the first CSI-RS. In some aspects, 1006 may be performed by the beam refinement component 199.

In some aspects, at 1014, the one or more CSI-RS REs are located prior to the one or more SRS REs in a resource sequence. For example, referring to FIG. 4, the one or more CSI-RS REs (e.g., CSI-RS REs 412, 414, and 416) are located prior to the one or more SRS REs (e.g., SRS REs 432, 434, 436, and 438) in the resource sequence.

In some aspects, a first latency between neighboring CSI-RS REs of the one or more CSI-RS REs is longer than a receiver gap, and a second latency between neighboring SRS REs of the one or more SRS REs is longer than a transmitter gap. For example, referring to FIG. 4, the first latency between neighboring CSI-RS REs (e.g., between REs 412 and 414) of the one or more CSI-RS REs is longer than a receiver gap, which may include the beam switching time for switching the beam (beam weights) from $g_1$ 405 to $g_2$ 406 and the beam synthesis and processing time at the UE side. A second latency between neighboring SRS REs (e.g., between REs 434 and 436) of the one or more SRS REs is longer than a transmitter gap, which may include the beam switching time for switching the beam (beam weights) from f2 426 to beam f3 427 and the beam synthesis and process-ing time at the network side.

In some aspects, at 1008, the network entity may receive, from the UE, a CSI-RS time indicator indicative of the receiver gap. For example, referring to FIG. 6, the network entity (base station 604) may receive, at 616, from the UE 602, a CSI-RS time indicator indicative of the receiver gap. In some aspects, 1008 may be performed by the beam refinement component 199.

In some aspects, an inter-RE latency between a last CSI-RS RE of the one or more CSI-RS REs and a first SRS RE of the one or more SRS REs is longer than a receiver gap and longer than a transmitter gap. For example, referring to FIG. 4, an inter-RE latency between a last CSI-RS RE 416 of the one or more CSI-RS REs and a first SRS RE 432 of the one or more SRS REs is longer than a receiver gap and longer than a transmitter gap. The receiver gap may include the beam switching time for switching the beam (beam weights) and the beam synthesis and processing time at the UE side, and the transmitter gap may include the beam switching time for switching the beam (beam weights) and the beam synthesis and processing time at the network side.

In some aspects, at 1016, at least one CSI-RS RE of the one or more CSI-RS REs is located prior to an SRS RE of the one or more SRS REs in a resource sequence, and at least one SRS RE of the one or more SRS REs is located prior to a CSI-RS RE of the one or more CSI-RS REs in the resource sequence. For example, referring to FIG. 5, at least one CSI-RS RE (e.g., CSI-RS RE 512) of the one or more CSI-RS REs is located prior to an SRS RE (e.g., SRS RE 532) of the one or more SRS REs in the resource sequence, and at least one SRS RE (e.g., SRS RE 532) of the one or more SRS REs is located prior to a CSI-RS RE (e.g., CSI-RS RE 514) of the one or more CSI-RS REs in the resource sequence.

In some aspects, a first latency between neighboring CSI-RS REs of the one or more CSI-RS REs is longer than a receiver gap, a second latency between neighboring SRS REs of the one or more SRS REs is longer than a transmitter gap, and an inter-RE latency between a CSI-RS RE and an SRS RE is longer than the receiver gap and longer than the transmitter gap. For example, referring to FIG. 4, the first latency between neighboring CSI-RS REs (e.g., between REs 412 and 414) is longer than a receiver gap, which may include the beam switching time for switching the beam (beam weights) from $g_1$ 405 to $g_2$ 406 and the beam syn-thesis and processing time at the UE side. A second latency between neighboring SRS REs (e.g., between REs 434 and 436) is longer than a transmitter gap, which may include the beam switching time for switching the beam (beam weights) from f2 426 to beam f3 427 and the beam synthesis and processing time at the network side. Referring to FIG. 5, the inter-RE latency between a CSI-RS RE 512 and an SRS RE 532 is longer than the receiver gap and longer than the transmitter gap.

In some aspects, at 1012, the network entity may identify the set of CSI-RS beam weights based on the first SRS; and transmit, to the UE, a second CSI-RS of the one or more CSI-RS using the set of CSI-RS beam weights. For example, referring to FIG. 6, the network entity (base station 604) may identify, at 624, the set of CSI-RS beam weights based on the first SRS; and transmit, at 626, to the UE 602, a second CSI-RS of the one or more CSI-RS using the set of CSI-RS beam weights. In some aspects, 1012 may be performed by the beam refinement component 199.

In some aspects, the set of CSI-RS beam weights for communicating on the one or more CSI-RSs is based on the at least one SRS of the one or more SRSs prior to the one or more CSI-RSs in a resource sequence, and where the one or more SRS REs are located prior to the one or more CSI-RS REs in the resource sequence. For example, refer-ring to FIG. 5, the set of CSI-RS beam weights (e.g., f3 527) for communicating on the one or more CSI-RSs is based on the at least one SRS of the one or more SRSs (e.g., at SRS RE 532) prior to the one or more CSI-RSs in the resource sequence. In some examples, the one or more SRS REs may be located prior to the one or more CSI-RS REs in the resource sequence.

Figure 11:
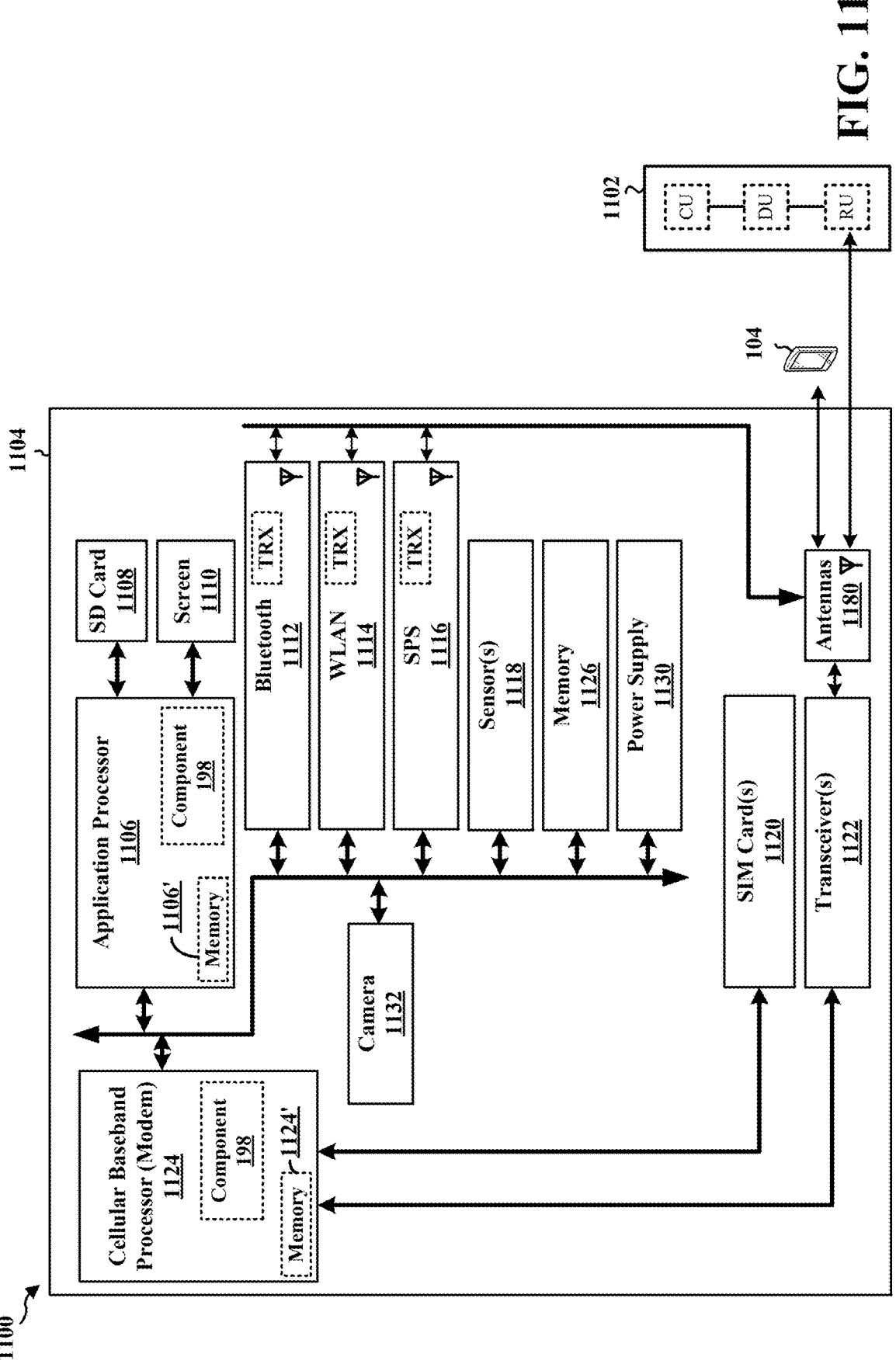
FIG. 11 is a diagram illustrating an example of a hardware implementation for an example apparatus and/or network entity.

FIG. 11 is a diagram 1100 illustrating an example of a hardware implementation for an apparatus 1104. The appa-ratus 1104 may be a UE, a component of a UE, or may implement UE functionality. In some aspects, the apparatus 1104 may include at least one cellular baseband processor (or processing circuitry) 1124 (also referred to as a modem) coupled to one or more transceivers 1122 (e.g., cellular RF transceiver). The cellular baseband processor(s) (or process-ing circuitry) 1124 may include at least one on-chip memory (or memory circuitry) 1124'. In some aspects, the apparatus 1104 may further include one or more subscriber identity modules (SIM) cards 1120 and at least one application processor (or processing circuitry) 1106 coupled to a secure digital (SD) card 1108 and a screen 1110. The application processor(s) (or processing circuitry) 1106 may include on-chip memory (or memory circuitry) 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) (or processing circuitry) 1124 communicates through the transceiver(s) 1122 via one or more antennas 1180 with the UE 104 and/or with an RU associated with a network entity 1102. The cellular baseband processor(s) (or processing circuitry) 1124 and the application processor(s) (or processing circuitry) 1106 may each include a computer-readable medium/memory (or memory circuitry) 1124', 1106', respectively. The additional memory modules 1126 may also be considered a computer-readable medium/memory (or memory circuitry). Each computer-readable medium/memory (or memory circuitry) 1124', 1106', 1126 may be non-transitory. The cellular baseband processor(s) (or processing circuitry) 1124 and the application processor(s) (or processing circuitry) 1106 are each responsible for general processing, including the execution of software stored on the computer-readable medium/memory (or memory circuitry). The software, when executed by the cellular baseband processor(s) (or processing circuitry) 1124/application processor(s) (or processing circuitry) 1106, causes the cellular baseband processor(s) (or processing circuitry) 1124/application processor(s) (or processing circuitry) 1106 to perform the various functions described supra. The cellular baseband processor(s) (or processing circuitry) 1124 and the application processor(s) (or processing circuitry) 1106 are configured to perform the various functions described supra based at least in part of the information stored in the memory (or memory circuitry). That is, the cellular baseband processor(s) (or processing circuitry) 1124 and the application processor(s) (or processing circuitry) 1106 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor(s) (or processing circuitry) 1124/application processor(s) (or processing circuitry) 1106 when executing software. The cellular baseband processor(s) (or processing circuitry) 1124/application processor(s) (or processing circuitry) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) (or processing circuitry) 1124 and/or the application processor(s) (or processing circuitry) 1106, and in another configuration, the apparatus 1104 may be the entire UE (e.g., see UE 350 of FIG. 3) and include the additional modules of the apparatus 1104.

As discussed supra, the component 198 may be configured to receive, from a network entity, a resource configuration including a set of communication resources for one or more CSI-RSs and one or more SRSs; and communicate, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. The component 198 may be further configured to perform any of the aspects described in connection with the flowcharts in FIG. 7 and FIG. 8, and/or performed by the UE 602 in FIG. 6. The component 198 may be within the cellular baseband processor(s) (or processing circuitry) 1124, the application processor(s) (or processing circuitry) 1106, or both the cellular baseband processor(s) (or processing circuitry) 1124 and the application processor(s) (or processing circuitry) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) (or processing circuitry) 1124 and/or the application processor(s) (or processing circuitry) 1106, includes means for receiving, from a network entity, a resource configuration including a set of communication resources for one or more CSI-RSs and one or more SRSs, and means for communicating, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. The apparatus 1104 may further include means for performing any of the aspects described in connection with the flowcharts in FIG. 7 and FIG. 8, and/or aspects performed by the UE 602 in FIG. 6. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
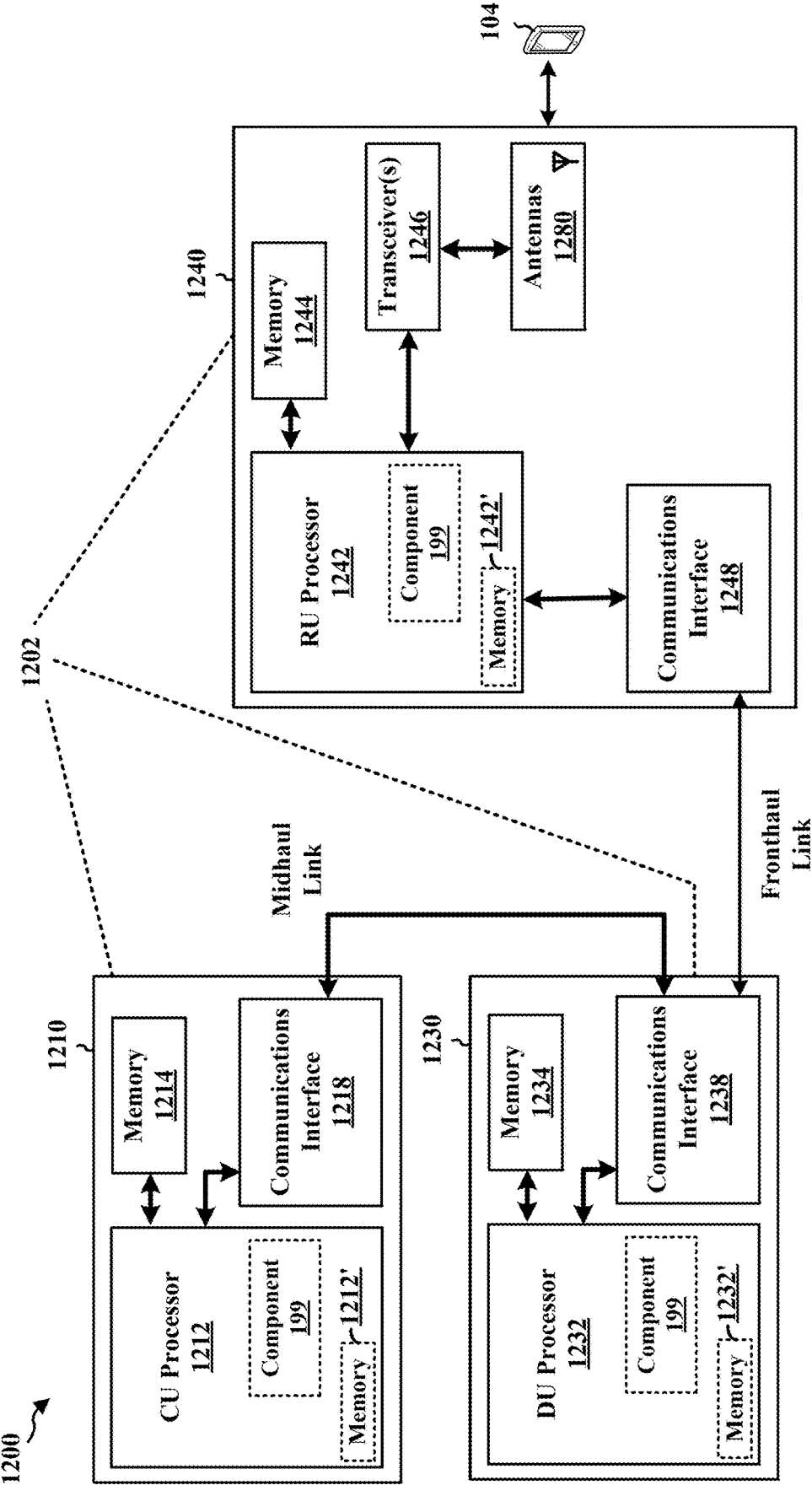
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor (or processing circuitry) 1212. The CU processor(s) (or processing circuitry) 1212 may include on-chip memory (or memory circuitry) 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor (or processing circuitry) 1232. The DU processor(s) (or processing circuitry) 1232 may include on-chip memory (or memory circuitry) 1232'. In some aspects, the DU 1230 may further include additional memory modules 1234 and a communications interface 1238. The DU 1230 communicates with the RU 1240 through a fronthaul link. The RU 1240 may include at least one RU processor (or processing circuitry) 1242. The RU processor(s) (or processing circuitry) 1242 may include on-chip memory (or memory circuitry) 1242'. In some aspects, the RU 1240 may further include additional memory modules 1244, one or more transceivers 1246, antennas 1280, and a communications interface 1248. The RU 1240 communicates with the UE 104. The on-chip memory (or memory circuitry) 1212', 1232', 1242' and the additional memory modules 1214, 1234, 1244 may each be considered a computer-readable medium/memory (or memory circuitry). Each computer-readable medium/memory (or memory circuitry) may be non-transitory. Each of the processors (or processing circuitry) 1212, 1232, 1242 is responsible for general processing, including the execution of software stored on the computer-readable medium/memory (or memory circuitry). The software, when executed by the corresponding processor(s) (or processing circuitry) causes the processor(s) (or processing circuitry) to perform the various functions described supra. The computer-readable medium/memory (or memory circuitry) may also be used for storing data that is manipulated by the processor(s) (or processing circuitry) when executing software.

As discussed supra, the component 199 may be configured to transmit, to a UE, a resource configuration including a set of communication resources for one or more CSI-RSs and one or more SRSs; and communicate, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs. The component 199 may be further configured to perform any of the aspects described in connection with the flowcharts in FIG. 9 and FIG. 10, and/or performed by the base station 604 in FIG. 6. The component 199 may be within one or more processors (or processing circuitry) of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 includes means for transmitting, to a UE, a resource configuration including a set of communication resources for one or more CSI-RSs and one or more SRSs, and means for communicating, with the UE, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs. The network entity 1202 may further include means for performing any of the aspects described in connection with the flowcharts in FIG. 9 and FIG. 10, and/or aspects performed by the base station 604 in FIG. 6. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, a resource configuration including a set of communication resources for one or more CSI-RSs and one or more SRSs; and communicating, with the network entity, on the one or more CSI-RSs and on the one or more SRSs, where at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence. By enabling joint and iterative beam refinement via coordinated transmission of RSs between the transmitting and receiving ends, the methods allow on-the-fly beam learning and refinement for a more responsive beamforming approach, thereby enhancing the efficiency and adaptability of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving, from a network entity, a resource configuration including a set of communication resources for one or more channel state information-reference signals (CSI-RSs) and one or more sounding reference signals (SRSs); and communicating, with the network entity, on the one or more CSI-RSs and on the one or more SRSs, wherein at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence.

Aspect 2 is the method of aspect 1, where the method further includes transmitting, to the network entity in response to the resource configuration, an adequacy indication that indicates whether the set of communication resources meets a condition for performing a beam refinement process, wherein communicating on the one or more CSI-RSs and on the one or more SRSs comprises: communicating, in response to the adequacy indication indicating the set of communication resources meeting the condition, on the one or more CSI-RSs and on the one or more SRSs.

Aspect 3 is the method of any of aspects 1 to 2, wherein the set of communication resources comprises one or more CSI-RS resource elements (REs) respectively corresponding to the one or more CSI-RSs and one or more SRS REs respectively corresponding to the one or more SRSs.

Aspect 4 is the method of aspect 3, wherein the set of SRS beam weights used for communicating on the one or more SRSs is based on the at least one CSI-RS of the one or more CSI-RSs, and wherein communicating on the one or more CSI-RSs and on the one or more SRSs comprises: receiving, from the network entity, a first CSI-RS of the one or more CSI-RSs; identifying, based on the first CSI-RS, the set of SRS beam weights for transmitting on the SRSs; and transmitting, to the network entity using the set of SRS beam weights, a first SRS of the one or more SRSs after the first CSI-RS.

Aspect 5 is the method of aspect 4, wherein identifying the set of SRS beam weights comprises: identifying, based on the first CSI-RS, the set of SRS beam weights corresponding to different phase shifter and amplitude control settings to use over an antenna array associated with the UE.

Aspect 6 is the method of any of aspects 1 to 5, where the method further includes receiving, from the network entity, a beam selection indication that indicates using the set of SRS beam weights for a transmission of the first SRS after the first CSI-RS.

Aspect 7 is the method of any of aspects 3 to 5, wherein the one or more CSI-RS REs are located prior to the one or more SRS REs in the resource sequence.

Aspect 8 is the method of aspect 7, wherein a first latency between neighboring CSI-RS REs of the one or more CSI-RS REs is longer than a receiver gap, and a second latency between neighboring SRS REs of the one or more SRS REs is longer than a transmitter gap.

Aspect 9 is the method of aspect 8, where the method further includes transmitting, to the network entity, a CSI-RS time indicator indicative of the receiver gap.

Aspect 10 is the method of any of aspects 7 to 9, wherein an inter-RE latency between the last CSI-RS RE of the one or more CSI-RS REs and the first SRS RE of the one or more SRS REs is longer than a receiver gap and longer than a transmitter gap.

Aspect 11 is the method of any of aspects 3 to 5, wherein at least one CSI-RS RE of the one or more CSI-RS REs is located prior to an SRS RE of the one or more SRS REs in the resource sequence, and at least one SRS RE of the one or more SRS REs is located prior to a CSI-RS RE of the one or more CSI-RS REs in the resource sequence.

Aspect 12 is the method of aspect 11, wherein a first latency between neighboring CSI-RS REs of the one or more CSI-RS REs is longer than a receiver gap, a second latency between neighboring SRS REs of the one or more SRS REs is longer than a transmitter gap, and an inter-RE latency between a CSI-RS RE and an SRS RE is longer than the receiver gap and longer than the transmitter gap.

Aspect 13 is the method of aspect 11, where the method further includes receiving, from the network entity, a second CSI-RS of the one or more CSI-RS after the first CSI-RS using the set of CSI-RS beam weights, wherein the set of CSI-RS beam weights is based on the first SRS.

Aspect 14 is the method of aspect 3, wherein the set of CSI-RS beam weights for communicating on the one or more CSI-RSs is based on the at least one SRS of the one or more SRSs prior to the one or more CSI-RSs in the resource sequence, and wherein the one or more SRS REs are located prior to the one or more CSI-RS REs in the resource sequence.

Aspect 15 is an apparatus for wireless communication at a UE, comprising: a processing system that includes processor circuitry and memory circuitry that stores code and is coupled with the processor circuitry, the processing system configured to cause the UE to perform the method of one or more of Aspects 1-14.

Aspect 16 is an apparatus for wireless communication at a UE, comprising: at least one memory; and at least one processor coupled to the at least one memory and, where the at least one processor, individually or in any combination, is configured to perform the method of any of aspects 1-14.

Aspect 17 is the apparatus for wireless communication at a UE, comprising means for performing each step in the method of any of aspects 1-14.

Aspect 18 is an apparatus of any of aspects 15-17, further comprising a transceiver configured to receive or to transmit in association with the method of any of aspects 1-14.

Aspect 19 is a computer-readable medium (e.g., a non-transitory computer-readable medium) storing computer executable code at a UE, the code when executed by at least one processor causes the at least one processor to, individually or in any combination, perform the method of any of aspects 1-14.

Aspect 20 is a method of wireless communication at a network entity. The method includes transmitting, to a user equipment (UE), a resource configuration including a set of communication resources for one or more channel state information-reference signals (CSI-RSs) and one or more sounding reference signals (SRSs); and communicating, with the UE, on the one or more CSI-RSs and on the one or more SRSs, wherein at least one of: a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs.

Aspect 21 is the method of aspect 20, where the method further includes receiving, from the UE, an adequacy indication that indicates whether the set of communication resources meets a condition for performing a beam refinement process, wherein communicating on the one or more CSI-RSs and on the one or more SRSs comprises: communicating, in response to the adequacy indication indicating the set of communication resources meeting the condition, on the one or more CSI-RSs and on the one or more SRSs.

Aspect 22 is the method of any of aspects 20 to 21, wherein the set of communication resources comprise one or more CSI-RS resource elements (REs) respectively corresponding to the one or more CSI-RSs and one or more SRS REs respectively corresponding to the one or more SRSs.

Aspect 23 is the method of aspect 22, wherein the set of SRS beam weights used for communicating on the one or more SRSs is based on the at least one CSI-RS of the one or more CSI-RSs, and wherein communicating on the one or more CSI-RSs and on the one or more SRSs comprises: transmitting, to the UE, a first CSI-RS of the one or more CSI-RSs; and receiving, from the UE, a first SRS of the one or more SRSs after the first CSI-RS, wherein the first SRS is transmitted via the set of SRS beam weights based on the first CSI-RS.

Aspect 24 is the method of aspect 23, where the method further includes transmitting, to the UE, a beam selection indication that indicates using the set of SRS beam weights for a transmission of the first SRS after the first CSI-RS.

Aspect 25 is the method of any of aspects 23 to 24, wherein the one or more CSI-RS REs are located prior to the one or more SRS REs in a resource sequence.

Aspect 26 is the method of aspect 25, wherein a first latency between neighboring CSI-RS REs of the one or more CSI-RS REs is longer than a receiver gap, and a second latency between neighboring SRS REs of the one or more SRS REs is longer than a transmitter gap.

Aspect 27 is the method of aspect 26, where the method further includes receiving, from the UE, a CSI-RS time indicator indicative of the receiver gap.

Aspect 28 is the method of aspect 25, wherein an inter-RE latency between the last CSI-RS RE of the one or more CSI-RS REs and the first SRS RE of the one or more SRS REs is longer than a receiver gap and longer than a transmitter gap.

Aspect 29 is the method of any of aspects 23 to 24, wherein at least one CSI-RS RE of the one or more CSI-RS REs is located prior to an SRS RE of the one or more SRS REs in a resource sequence, and at least one SRS RE of the one or more SRS REs is located prior to a CSI-RS RE of the one or more CSI-RS REs in the resource sequence.

Aspect 30 is the method of aspect 29, wherein a first latency between neighboring CSI-RS REs of the one or more CSI-RS REs is longer than a receiver gap, a second latency between neighboring SRS REs of the one or more SRS REs is longer than a transmitter gap, and an inter-RE latency between a CSI-RS RE and an SRS RE is longer than the receiver gap and longer than the transmitter gap.

Aspect 31 is the method of aspect 29, where the method further includes identifying the set of CSI-RS beam weights based on the first SRS; and transmitting, to the UE, a second CSI-RS of the one or more CSI-RS using the set of CSI-RS beam weights.

Aspect 32 is the method of aspect 22, wherein the set of CSI-RS beam weights for communicating on the one or more CSI-RSs is based on the at least one SRS of the one or more SRSs prior to the one or more CSI-RSs in a resource sequence, and wherein the one or more SRS REs are located prior to the one or more CSI-RS REs in the resource sequence.

Aspect 33 is an apparatus for wireless communication at a network entity, comprising: a processing system that includes processor circuitry and memory circuitry that stores code and is coupled with the processor circuitry, the processing system configured to cause the network entity to perform the method of one or more of aspects 20-32.

Aspect 34 is an apparatus for wireless communication at a network entity, comprising: at least one memory; and at least one processor coupled to the at least one memory and, where the at least one processor, individually or in any combination, is configured to perform the method of any of aspects 20-32.

Aspect 35 is the apparatus for wireless communication at a network entity, comprising means for performing each step in the method of any of aspects 20-32.

Aspect 36 is an apparatus of any of aspects 33-35, further comprising a transceiver configured to receive or to transmit in association with the method of any of aspects 20-32.

Aspect 37 is a computer-readable medium (e.g., a non-transitory computer-readable medium) storing computer executable code at a network entity, the code when executed by at least one processor causes the at least one processor to, individually or in any combination, perform the method of any of aspects 20-32.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive, from a network entity, a resource configuration including a set of communication resources for one or more channel state information-reference signals (CSI-RSs) and one or more sounding reference signals (SRSs);

transmit, to the network entity in response to the resource configuration, an adequacy indication that indicates whether the set of communication resources meets a condition for performing a beam refinement process; and communicate, with the network entity in response to the adequacy indication indicating the set of communication resources meeting the condition, on the one or more CSI-RSs and on the one or more SRSs, wherein at least one of:

a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence.

2. The apparatus of claim 1, further comprising a transceiver coupled to the at least one processor, wherein, to receive the resource configuration, the at least one processor is configured to receive the resource configuration via the transceiver.

3. The apparatus of claim 1, wherein the set of communication resources comprises one or more CSI-RS resource elements (REs) respectively corresponding to the one or more CSI-RSs and one or more SRS REs respectively corresponding to the one or more SRSs.

4. The apparatus of claim 3, wherein the set of SRS beam weights used for communicating on the one or more SRSs is based on the at least one CSI-RS of the one or more CSI-RSs, and wherein to communicate on the one or more CSI-RSs and on the one or more SRSs, the at least one processor is configured to:

receive, from the network entity, a first CSI-RS of the one or more CSI-RSs;

identify, based on the first CSI-RS, the set of SRS beam weights for transmitting on the SRSs; and transmit, to the network entity using the set of SRS beam weights, a first SRS of the one or more SRSs after the first CSI-RS.

5. The apparatus of claim 3, wherein the set of CSI-RS beam weights for communicating on the one or more CSI-RSs is based on the at least one SRS of the one or more SRSs prior to the one or more CSI-RSs in the resource sequence, and wherein the one or more SRS REs are located prior to the one or more CSI-RS REs in the resource sequence.

6. The apparatus of claim 4, wherein to identify the set of SRS beam weights, the at least one processor is configured to:

identify, based on the first CSI-RS, the set of SRS beam weights corresponding to different phase shifter and amplitude control settings to use over an antenna array associated with the UE.

7. The apparatus of claim 6, wherein the at least one processor is further configured to:

receive, from the network entity, a beam selection indication that indicates using the set of SRS beam weights for a transmission of the first SRS after the first CSI-RS.

8. The apparatus of claim 6, wherein the one or more CSI-RS REs are located prior to the one or more SRS REs in the resource sequence.

9. The apparatus of claim 6, wherein at least one CSI-RS RE of the one or more CSI-RS REs is located prior to an SRS RE of the one or more SRS REs in the resource sequence, and at least one SRS RE of the one or more SRS REs is located prior to a CSI-RS RE of the one or more CSI-RS REs in the resource sequence.

10. The apparatus of claim 8, wherein a first latency between neighboring CSI-RS REs of the one or more CSI-RS REs is longer than a receiver gap, and a second latency between neighboring SRS REs of the one or more SRS REs is longer than a transmitter gap.

11. The apparatus of claim 8, wherein an inter-RE latency between a last CSI-RS RE of the one or more CSI-RS REs and a first SRS RE of the one or more SRS REs is longer than a receiver gap and longer than a transmitter gap.

12. The apparatus of claim 10, wherein the at least one processor is further configured to:

transmit, to the network entity, a CSI-RS time indicator indicative of the receiver gap.

13. The apparatus of claim 9, wherein a first latency between neighboring CSI-RS REs of the one or more CSI-RS REs is longer than a receiver gap, a second latency between neighboring SRS REs of the one or more SRS REs is longer than a transmitter gap, and an inter-RE latency between the CSI-RS RE and the SRS RE is longer than the receiver gap and longer than the transmitter gap.

14. The apparatus of claim 9, wherein the at least one processor is further configured to:

receive, from the network entity, a second CSI-RS of the one or more CSI-RS after the first CSI-RS using the set of CSI-RS beam weights, wherein the set of CSI-RS beam weights is based on the first SRS.

15. An apparatus for wireless communication at a network entity, comprising:

at least one memory; and at least one processor coupled to the at least one memory and, based at least in part on information stored in the at least one memory, the at least one processor is configured to:

transmit, to a user equipment (UE), a resource configuration including a set of communication resources for one or more channel state information-reference signals (CSI-RSs) and one or more sounding reference signals (SRSs);

receive, from the UE, an adequacy indication that indicates whether the set of communication resources meets a condition for performing a beam refinement process; and communicate, with the UE in response to the adequacy indication indicating the set of communication resources meeting the condition, on the one or more CSI-RSs and on the one or more SRSs, wherein at least one of:

a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs.

16. The apparatus of claim 15, further comprising a transceiver coupled to the at least one processor, wherein, to transmit the resource configuration, the at least one processor is configured to transmit the resource configuration via the transceiver.

17. The apparatus of claim 15, wherein the set of communication resources comprises one or more CSI-RS resource elements (REs) respectively corresponding to the one or more CSI-RSs and one or more SRS REs respectively corresponding to the one or more SRSs.

18. The apparatus of claim 17, wherein the set of CSI-RS beam weights for communicating on the one or more CSI-RSs is based on the at least one SRS of the one or more SRSs prior to the one or more CSI-RSs in a resource sequence, and wherein the one or more SRS REs are located prior to the one or more CSI-RS REs in the resource sequence.

19. The apparatus of claim 17, wherein the set of SRS beam weights used for communicating on the one or more SRSs is based on the at least one CSI-RS of the one or more CSI-RSs, and wherein to communicate on the one or more CSI-RSs and on the one or more SRSs, the at least one processor is configured to:

transmit, to the UE, a first CSI-RS of the one or more CSI-RSs; and receive, from the UE, a first SRS of the one or more SRSs after the first CSI-RS, wherein the first SRS is transmitted using the set of SRS beam weights based on the first CSI-RS.

20. The apparatus of claim 19, wherein the at least one processor is further configured to:

transmit, to the UE, a beam selection indication that indicates using the set of SRS beam weights for a transmission of the first SRS after the first CSI-RS.

21. The apparatus of claim 19, wherein the one or more CSI-RS REs are located prior to the one or more SRS REs in a resource sequence.

22. The apparatus of claim 19, wherein at least one CSI-RS RE of the one or more CSI-RS REs is located prior to an SRS RE of the one or more SRS REs in a resource sequence, and at least one SRS RE of the one or more SRS REs is located prior to a CSI-RS RE of the one or more CSI-RS REs in the resource sequence.

23. The apparatus of claim 21, wherein a first latency between neighboring CSI-RS REs of the one or more CSI-RS REs is longer than a receiver gap, and a second latency between neighboring SRS REs of the one or more SRS REs is longer than a transmitter gap.

24. The apparatus of claim 21, wherein an inter-RE latency between a last CSI-RS RE of the one or more CSI-RS REs and a first SRS RE of the one or more SRS REs is longer than a receiver gap and longer than a transmitter gap.

25. The apparatus of claim 23, wherein the at least one processor is further configured to:

receive, from the UE, a CSI-RS time indicator indicative of the receiver gap.

26. The apparatus of claim 22, wherein a first latency between neighboring CSI-RS REs of the one or more CSI-RS REs is longer than a receiver gap, a second latency between neighboring SRS REs of the one or more SRS REs is longer than a transmitter gap, and an inter-RE latency between the CSI-RS RE and the SRS RE is longer than the receiver gap and longer than the transmitter gap.

27. The apparatus of claim 22, wherein the at least one processor is further configured to:

identify the set of CSI-RS beam weights based on the first SRS; and transmit, to the UE, a second CSI-RS of the one or more CSI-RS using the set of CSI-RS beam weights.

28. A method of wireless communication at a user equipment (UE), comprising:

receiving, from a network entity, a resource configuration including a set of communication resources for one or more channel state information-reference signals (CSI-RSs) and one or more sounding reference signals (SRSs);

transmitting, to the network entity in response to the resource configuration, an adequacy indication that indicates whether the set of communication resources meets a condition for performing a beam refinement process; and communicating, with the network entity in response to the adequacy indication indicating the set of communication resources meeting the condition, on the one or more CSI-RSs and on the one or more SRSs, wherein at least one of:

a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs prior to the one or more CSI-RSs in a resource sequence.

29. A method of wireless communication at a network entity, comprising:

transmitting, to a user equipment (UE), a resource configuration including a set of communication resources for one or more channel state information-reference signals (CSI-RSs) and one or more sounding reference signals (SRSs);

receiving, from the UE, an adequacy indication that indicates whether the set of communication resources meets a condition for performing a beam refinement process; and communicating, with the UE in response to the adequacy indication indicating the set of communication resources meeting the condition, on the one or more CSI-RSs and on the one or more SRSs, wherein at least one of:

a set of SRS beam weights used for communicating on the one or more SRSs is based on at least one CSI-RS of the one or more CSI-RSs, or a set of CSI-RS beam weights used for communicating on the one or more CSI-RSs is based on at least one SRS of the one or more SRSs.

* * * * *